(12) United States Patent
Denoual et al.

(10) Patent No.: US 11,184,683 B2
(45) Date of Patent: Nov. 23, 2021

(54) METHODS, DEVICES, AND COMPUTER PROGRAMS FOR IMPROVING RENDERING DISPLAY DURING STREAMING OF TIMED MEDIA DATA

(71) Applicant: CANON KABUSHIKI KAISHA, Tokyo (JP)

(72) Inventors: Franck Denoual, Saint Domineuc (FR); Frédéric Maze, Langan (FR); Jonathan Taquet, Talensac (FR); Naël Ouedraogo, Maure de Bretagne (FR); Cyril Concolato, Combs la Ville (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/185,771

(22) Filed: Feb. 25, 2021

(65) Prior Publication Data

US 2021/0185411 A1 Jun. 17, 2021

Related U.S. Application Data

(63) Continuation of application No. 16/340,079, filed as application No. PCT/EP2017/075870 on Oct. 10, 2017, now Pat. No. 10,979,783.

(30) Foreign Application Priority Data

Oct. 10, 2016 (GB) ..................................... 1617205

(51) Int. Cl.
*G06F 15/177* (2006.01)
*H04N 21/845* (2011.01)
(Continued)

(52) U.S. Cl.
CPC ..... *H04N 21/8456* (2013.01); *H04L 65/4084* (2013.01); *H04L 65/607* (2013.01); *H04N 21/23439* (2013.01); *H04N 21/85406* (2013.01)

(58) Field of Classification Search
CPC ......... H04N 21/8456; H04N 21/23439; H04N 21/85406; H04L 65/4084; H04L 65/607
(Continued)

(56) References Cited

U.S. PATENT DOCUMENTS 5,491,645 A * 2/1996 Kennedy ................. G01S 13/72
342/95
8,259,800 B2 * 9/2012 Wang ................... H04N 19/172
375/240.12
(Continued)

FOREIGN PATENT DOCUMENTS

KR 10-2019-0009378 A 1/2019

*Primary Examiner* — Alicia Baturay
(74) *Attorney, Agent, or Firm* — Canon U.S.A., Inc. IP Division

(57) ABSTRACT

The invention relates to improving rendering display during streaming of timed media data comprising images, between a server apparatus and a client apparatus. After having obtained a quality information related to a quality disparity between portions of an image of the timed media data, at least a first and a second item of data belonging to at least a first and a second portion of an image to be at least partially displayed, respectively, the quality disparity between the portions of image corresponding to the first and second items of data being compliant with the obtained quality information, are transmitted.

16 Claims, 12 Drawing Sheets

(51) Int. Cl.
  *H04L 29/06* (2006.01)
  *H04N 21/2343* (2011.01)
  *H04N 21/854* (2011.01)
(58) Field of Classification Search
  USPC ........................................................ 709/228
  See application file for complete search history.

(56) References Cited

U.S. PATENT DOCUMENTS

| | | | | |
|---|---|---|---|---|
| 8,396,983 | B1 * | 3/2013 | Inskip | H04L 65/80 |
| | | | | 709/233 |
| 9,049,449 | B2 * | 6/2015 | Wang | H04N 19/423 |
| 9,294,531 | B2 * | 3/2016 | Zhang | H04L 65/607 |
| 9,521,469 | B2 * | 12/2016 | Zhang | H04N 21/85406 |
| 9,628,533 | B2 * | 4/2017 | Denoual | H04N 21/64322 |
| 9,749,705 | B2 * | 8/2017 | Kwak | H04N 21/4345 |
| 9,794,649 | B2 * | 10/2017 | Denoual | H04N 21/23439 |
| 9,854,375 | B2 * | 12/2017 | Stockhammer | H04N 21/8456 |
| 9,860,571 | B2 * | 1/2018 | Kwak | H04H 20/93 |
| 9,866,605 | B2 * | 1/2018 | Begen | H04N 21/6125 |
| 9,929,888 | B2 * | 3/2018 | Kwak | H04H 20/33 |
| 9,986,301 | B2 * | 5/2018 | Lee | H04N 21/64322 |
| 10,084,842 | B2 * | 9/2018 | Lee | H04L 65/80 |
| 10,123,039 | B2 * | 11/2018 | Rusert | H04N 19/30 |
| 10,205,556 | B2 * | 2/2019 | Kwak | H04L 1/0042 |
| 10,257,247 | B2 * | 4/2019 | Denoual | H04N 21/234327 |
| 10,270,989 | B2 * | 4/2019 | Oh | H04N 21/2362 |
| 10,305,941 | B2 * | 5/2019 | Lee | H04N 21/4345 |
| 10,313,679 | B2 * | 6/2019 | Kopietz | A63F 13/30 |
| 10,419,738 | B2 * | 9/2019 | Phillips | H04N 21/21805 |
| 10,432,970 | B1 * | 10/2019 | Phillips | H04N 19/70 |
| 10,433,027 | B2 * | 10/2019 | Kim | H04N 21/2362 |
| 10,440,416 | B1 * | 10/2019 | Phillips | H04N 19/70 |
| 10,523,914 | B1 * | 12/2019 | Phillips | H04N 19/146 |
| 10,554,984 | B2 * | 2/2020 | Kopietz | A63F 13/355 |
| 10,567,780 | B2 * | 2/2020 | Phillips | H04N 19/174 |
| 10,587,883 | B2 * | 3/2020 | Wang | H04N 19/70 |
| 10,623,736 | B2 * | 4/2020 | Phillips | H04N 21/23439 |
| 10,674,185 | B2 * | 6/2020 | Thomas | H04N 19/167 |
| 10,674,229 | B2 * | 6/2020 | Krauss | H04N 21/8106 |
| 10,715,843 | B2 * | 7/2020 | Van Brandenburg | |
| | | | | H04N 21/2353 |
| 10,742,705 | B2 * | 8/2020 | Kwak | H04N 21/6112 |
| 10,757,389 | B2 * | 8/2020 | Phillips | H04N 21/21805 |
| 10,812,775 | B2 * | 10/2020 | Phillips | H04N 13/307 |
| 10,841,353 | B2 * | 11/2020 | Phillips | H04N 21/4825 |
| 10,841,566 | B2 * | 11/2020 | He | H04N 21/23439 |
| 10,841,662 | B2 * | 11/2020 | Phillips | G06F 3/011 |
| 10,861,435 | B2 * | 12/2020 | Misra | G06F 40/263 |
| 10,862,943 | B2 * | 12/2020 | Maze | H04N 21/440245 |
| 10,893,256 | B2 * | 1/2021 | Hannuksela | H04N 13/117 |
| 10,903,922 | B2 * | 1/2021 | Lee | H04L 65/608 |
| 10,917,564 | B2 * | 2/2021 | Hendry | H04N 19/61 |
| 10,979,783 | B2 * | 4/2021 | Denoual | H04N 21/8456 |
| 11,051,083 | B2 * | 6/2021 | Takahashi | H04N 21/85406 |
| 2015/0006621 | A1 * | 1/2015 | Westphal | H04L 65/4084 |
| | | | | 709/203 |
| 2016/0149956 | A1 * | 5/2016 | Birnbaum | H04L 63/101 |
| | | | | 726/1 |
| 2018/0213216 | A1 * | 7/2018 | Hwang | H04N 13/156 |
| 2018/0242028 | A1 * | 8/2018 | Van Brandenburg | |
| | | | | H04N 21/26258 |
| 2019/0014165 | A1 * | 1/2019 | Stockhammer | H04L 65/605 |
| 2019/0014362 | A1 * | 1/2019 | Wang | H04N 21/21805 |
| 2019/0116386 | A1 * | 4/2019 | Tsukagoshi | H04N 21/462 |
| 2019/0141311 | A1 * | 5/2019 | Lee | H04N 19/597 |
| 2019/0158935 | A1 * | 5/2019 | Denoual | H04N 19/167 |
| 2020/0037029 | A1 * | 1/2020 | He | H04L 65/80 |
| 2020/0045323 | A1 * | 2/2020 | Hannuksela | H04N 21/8543 |
| 2020/0053392 | A1 * | 2/2020 | Hannuksela | H04N 19/31 |
| 2020/0077126 | A1 * | 3/2020 | Yim | H04N 21/6112 |
| 2020/0120326 | A1 * | 4/2020 | Deshpande | H04N 21/8456 |
| 2020/0137136 | A1 * | 4/2020 | Skupin | H04N 21/234327 |
| 2020/0221063 | A1 * | 7/2020 | Kammachi Sreedhar | |
| | | | | H04N 13/172 |
| 2020/0236278 | A1 * | 7/2020 | Yeung | H04N 5/268 |
| 2020/0244942 | A1 * | 7/2020 | Maze | H04N 21/2353 |
| 2020/0250891 | A1 * | 8/2020 | Curcio | H04N 21/8586 |
| 2020/0260071 | A1 * | 8/2020 | Hannuksela | H04N 19/597 |
| 2020/0286283 | A1 * | 9/2020 | Takahashi | H04N 5/926 |
| 2020/0288171 | A1 * | 9/2020 | Hannuksela | H04N 13/128 |
| 2020/0288217 | A1 * | 9/2020 | Takahashi | H04N 21/21805 |
| 2020/0304552 | A1 * | 9/2020 | Wang | H04N 21/26258 |
| 2020/0321015 | A1 * | 10/2020 | Katsumata | G10K 15/02 |
| 2020/0358838 | A1 * | 11/2020 | Wang | H04N 21/21805 |
| 2020/0389676 | A1 * | 12/2020 | Denoual | H04N 21/85406 |
| 2021/0021909 | A1 * | 1/2021 | Wang | G06T 15/00 |
| 2021/0058600 | A1 * | 2/2021 | Deshpande | H04N 13/178 |
| 2021/0194946 | A1 * | 6/2021 | Hannuksela | H04N 19/597 |
| 2021/0209829 | A1 * | 7/2021 | Ilola | G06T 15/005 |
| 2021/0211780 | A1 * | 7/2021 | Deshpande | H04N 21/8106 |

\* cited by examiner

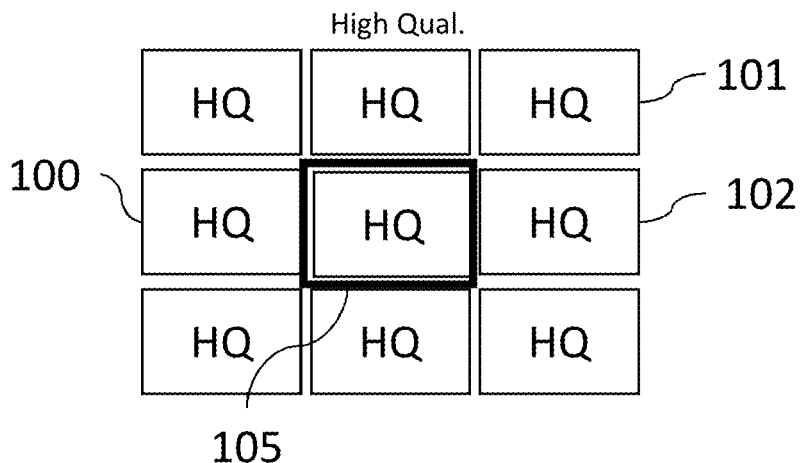
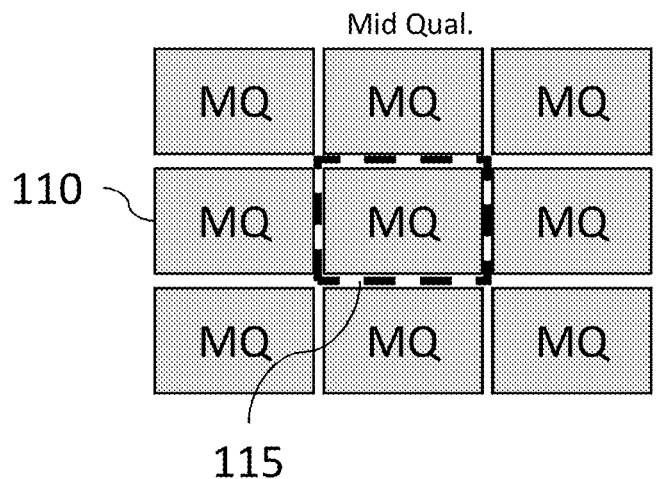
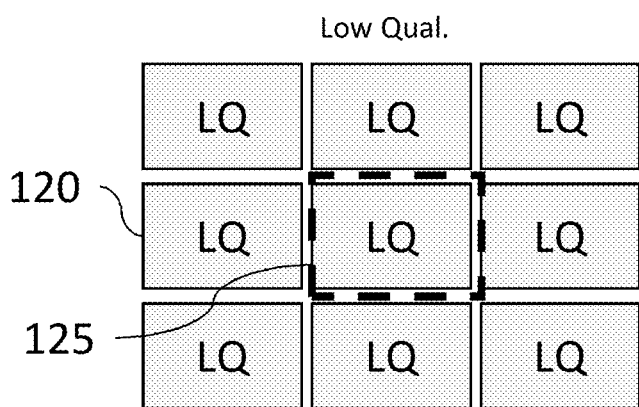
Fig. 1a

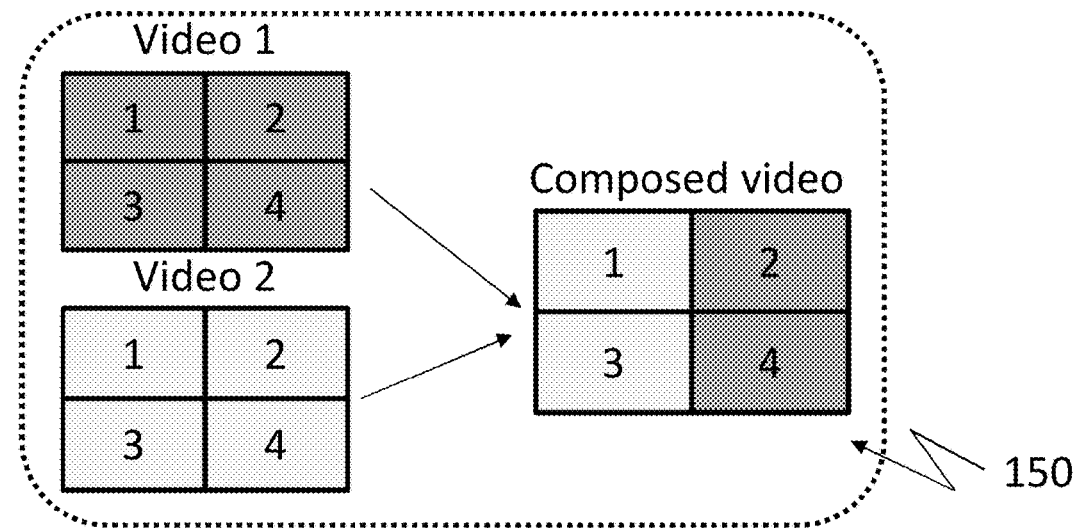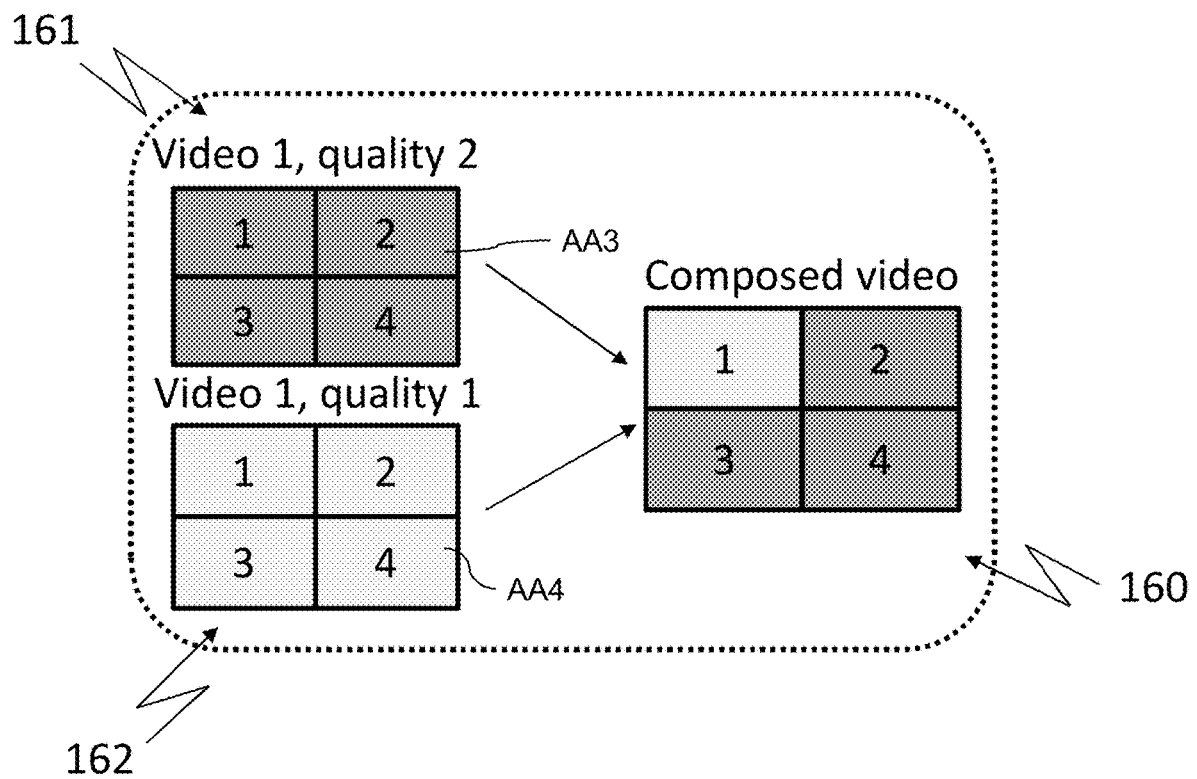
Fig. 1b

```
<?xml version="1.0" encoding="UTF-8"?>
<MPD ...>
<Period ... >    <!-- 9 tiles -->
<AdaptationSet id="1" [...]    <!-- Tile 1, 3 alternative Representations -->
    <SupplementalProperty schemeIdUri="urn:mpeg:dash:srd:2014" value="1, 0, 0, 1, 1, 3, 3"/>
    <Representation id="1.1" bandwidth="5000000" width="1920" height="1080" ...>  ...  </Representation>
    <Representation id="1.2" bandwidth="250000" width="1920" height="1080" ...>  ...  </Representation>
    <Representation id="1.3" bandwidth="1000000" width="1920" height="1080" ...>  ...  </Representation>
</AdaptationSet>
<!-- Description of the 8 other tiles, each with 3 alternative Representations "-->

<AdaptationSet virtual="true" purpose="HEVC tiling" ...>  <!-- This is the content component selection element -->
    <SupplementalProperty schemeIdUri="urn:mpeg:dash:srd:2014" value="1, 0, 0, 3, 3, 3, 3"/>
    <SupplementalProperty schemeIdUri="urn:mpeg:dash:decoder-reqs" value="multiple"/>
    <Representation id="C.1" bandwidth="8000000" width="3840" height="2160"
        dependencyId="5.1" associationId="1.1 2.1 3.1 4.1 6.1 7.1 8.1 9.1" associationType="aggregate" ...></Representation>
    <Representation id="C.2" bandwidth="500000" width="3840" height="2160"
dependencyId="5.1" associationId="1.2 2.2 3.2 4.2 6.2 7.2 8.2 9.2" associationType="aggregate" ...> ... </Representation>
    <Representation id="C.3" bandwidth="3000000" width="3840" height="2160"
dependencyId="5.2" associationId="1.3 2.3 3.3 4.2 6.2 7.2 8.3 9.3" associationType="aggregate" ...> ... </Representation>
...
</AdaptationSet>
</Period>
</MPD>
```

Fig. 6a

```xml
<?xml version="1.0" encoding="UTF-8"?>
<MPD ...}>
<Period ...>    <!-- 9 tiles -->
   <AdaptationSet id="1" [...] tag="AS1">    <!-- Tile 1, 3 alternative Representations "HQ", "MQ" and "LQ" -->
     <SupplementalProperty schemeIdUri="urn:mpeg:dash:srd:2014" value="1, 0, 0, 1, 1, 3, 3"/>
     <Representation id="1.1" bandwidth="5000000" width="1920" height="1080" ...> ...   </Representation>
     <Representation id="1.2" bandwidth="2500000" width="1920" height="1080" ...> ...   </Representation>
     <Representation id="1.3" bandwidth="1000000" width="1920" height="1080" ...> ...   </Representation>
   </AdaptationSet>
<!-- Description of the 8 other tiles, each with 3 alternative Representations -->

<Preselection id="P1" codecs="hvc2..." preselectionComponents=" AS1, AS2... AS9"...>  <!-- This is the content component selection element -->
   <SupplementalProperty schemeIdUri="urn:mpeg:dash:srd:2014" value="1, 0, 0, 3, 3, 3, 3"/>
   <SupplementalProperty schemeIdUri="urn:mpeg:dash:decoder-reqs" value="single&bitstreamReconstruction"/>
   <SupplementalProperty schemeIdUri="urn:mpeg:dash:purpose" value="tile composition"/>
   <Representation id="C.1" bandwidth="8000000" width="3840" height="2160"
       dependencyId="5.1" associationId="1.1 2.1 3.1 4.1 6.1 7.1 8.1 9.1" associationType="aggregate" qualityRanking=0...>
   </Representation>
   <Representation id="C.2" bandwidth="500000" width="3840" height="2160" ... qualityRanking="1" ...  >  ...
   <Representation id="C.3" bandwidth="3000000" width="3840" height="2160" ... qualityRanking="2" ...>  ...

</Preselection>
...
</Period>
</MPD>
```

Fig. 6b

```
<?xml version="1.0" encoding="UTF-8"?>
<MPD ...]>
<Period ... >    <!-- 9 tiles -->
<SupplementalProperty schemeIdUri="urn:mpeg:dash:quality-rule" value="max-diff=2"/>
<SupplementalProperty schemeIdUri="urn:mpeg:dash:quality-equivalence" value="1, 2... 9"/>
<AdaptationSet id="1" [...] tag="AS1">    <!-- Tile 1, 3 alternative Representations "HQ", "MQ" and "LQ" -->
<SupplementalProperty schemeIdUri="urn:mpeg:dash:srd:2014" value="1, 0, 0, 1, 1, 3, 3"/>
<Representation id="1.1" bandwidth="5000000" width="1920" height="1080" qualityRanking="0" ...>
<Representation id="1.2" bandwidth="2500000" width="1920" height="1080" qualityRanking="1" ...>
<Representation id="1.3" bandwidth="1000000" width="1920" height="1080" qualityRanking="2" ...>
</AdaptationSet>
<!-- Description of the 8 other tiles, each with 3 alternative Representations -->
<Preselection id="P1" preselectionComponents=" AS1, AS2... AS9" ... />
<!-- This is the content component selection element -->
...
</Period>
</MPD>
```

Fig. 6c

```xml
<?xml version="1.0" encoding="UTF-8"?>
<MPD ...]>
 <Period ...>   <!-- 9 tiles -->
 <SupplementalProperty schemeIdUri="urn:mpeg:dash:quality-rule" value="max-diff= 2"/>
 <AdaptationSet id="1" [...] tag="AS1">   <!-- Tile 1, 3 alternative Representations "HQ", "MQ" and "LQ" -->
  <SupplementalProperty schemeIdUri="urn:mpeg:dash:srd:2014" value="1, 0, 0, 1, 1, 3, 3"/>
  <Representation id="1.1" bandwidth="5000000" width="1920" height="1080" preselect="HQ" ...> ...
  <Representation id="1.2" bandwidth="2500000" width="1920" height="1080" preselect="MQ" ...> ...
  <Representation id="1.3" bandwidth="1000000" width="1920" height="1080" preselect="LQ" ...> ...
 </AdaptationSet>

<!-- Description of the 8 other tiles, each with 3 alternative Representations -->
 <Preselection id="P1"  preselectionComponents=" AS1, AS2... AS9" ... levels="HQ, MQ, LQ"/>
 <!-- This is the content component selection element -->

</Period>
</MPD>
```

Fig. 6d

METHODS, DEVICES, AND COMPUTER PROGRAMS FOR IMPROVING RENDERING DISPLAY DURING STREAMING OF TIMED MEDIA DATA

This application is a continuation of U.S. patent application Ser. No. 16/340,079, filed on Apr. 5, 2019, which is a National Phase application of PCT Application No. PCT/EP2017/075870, filed on Oct. 10, 2017. This application claims the benefit under 35 U.S.C. § 119(a)-(d) of United Kingdom Patent Application No. 1617205.8, filed on Oct. 10, 2016. The above-cited patent applications are incorporated herein by reference in their entirety.

FIELD OF THE INVENTION

The invention generally relates to the field of timed media data streaming over communication networks, for example communication networks conforming to Internet Protocol (IP) standard, making it possible to transmit video data as sets of spatiotemporal samples corresponding to a given spatial area of the original video. More particularly, the invention concerns methods, devices, and computer programs for improving rendering display during streaming of timed media data.

BACKGROUND OF THE INVENTION

Video coding is a way of transforming a series of video images into a compact digitized bit-stream so that the video images can be transmitted or stored. An encoding device is used to code the video images, with an associated decoding device being available to reconstruct the bit-stream for displaying the video images. A general aim is to form the bit-stream so as to be of smaller size than the original video information. This advantageously reduces the capacity required for a communication network or a storage device, to transmit or store the bit-stream code. To be transmitted, a video bit-stream, or video stream, is generally encapsulated according to a transmission protocol that typically adds headers, descriptive metadata, and check bits. This concept of compressed bit-stream not only applies to video but also to other media types like audio and eventually metadata. A "media stream" does not target any specific media type.

Streaming media data over a communication network typically means that the data representing a media presentation are provided by a host computer, referred to as a server apparatus, to a playback device, referred to as a client apparatus, over the communication network. The client apparatus is generally a media playback computer implemented as any of a variety of conventional computing devices, such as a desktop Personal Computer (PC), a tablet PC, a notebook or a portable computer, a cellular telephone, a wireless handheld device, a personal digital assistant (PDA), a gaming console, or a head-mounted display. The client apparatus typically renders a streamed content as it is received from the host (rather than waiting for an entire file to be delivered).

A media presentation generally comprises several media components such as audio, video, text, metadata, and/or subtitles that can be sent from a server apparatus to a client apparatus for being jointly played by the client apparatus. Those media components are typically encoded individually into separate media streams and next, they are encapsulated into multiple media segments, either together or individually, and sent from a server apparatus to a client apparatus for being jointly played by the latter.

A common practice aims at giving access to several versions of the same media component so that the client apparatus can select one version as a function of its characteristics (e.g. resolution, computing power, and bandwidth). According to existing proprietary solutions, each of the alternative versions is described and media data are segmented into small temporal segments.

In the context of the dynamic and adaptive streaming over HTTP, a standard called DASH (Dynamic Adaptive Streaming over HTTP) has emerged from the MPEG standardization committee ("ISO/IEC 23009-1, Dynamic adaptive streaming over HTTP (DASH), Part1: Media presentation description and segment formats"). This standard enables association of a compact description of the media content of a media presentation with HTTP Uniform Resource Locations (URLs). Such an association is typically described in a file called a manifest file or a description file. In the context of DASH, this manifest file is an XML file also called the MPD file (Media Presentation Description). There are other manifest-based streaming solutions like Smooth Streaming, also using XML file, or like HTTP Live Streaming rather using plain text file for the manifest, also called playlist. As preferred embodiments, DASH is used as streaming protocol however, the descriptive information added in the manifest would provide the same effects in these other solutions.

Manifest files gather a set of descriptors that specify descriptive information on the media samples described in the manifest. A descriptor may be structured elements like for example XML nodes (elements and/or attributes) or may be described with JSON (JavaScript Object Notation, JavaScript is a trademark) or even in plain text format provided that keywords or comments are dedicated to convey these descriptors.

By receiving an MPD file, or more generally a manifest file, a client apparatus gets the description of each media content component. Accordingly, it is aware of the kind of media content components proposed in the media presentation and knows the HTTP URLs to be used for downloading the associated media segments. Therefore, the client device can decide which media content components to download (via HTTP requests) and to play (i.e. to decode and to play after reception of the media segments).

In addition to such an association, the DASH standard proposes to split each media content as a function of periods of time. The time decomposition is described in the MPD file. Accordingly, the latter defines the association between HTTP URLs and the compact description of each component from media content over each period of time. Each media content component can be encapsulated into multiple independent media segments corresponding to these periods of time. The number of media components can change from one period to another and/or their properties may also vary from one period to another. This decomposition into time period is represented in DASH by a <Period> element.

This standard allows a client to download desired media content components of a media presentation over desired periods of time.

The information exposed in the manifest is actually extracted from descriptive metadata added to the compressed media data during an encapsulation step. Different encapsulation formats, also sometimes called container formats, exist like for example ISO Base Media File Format (ISO BMFF), WebM, Quicktime, MPEG-2 Transport Stream, and Common Media Application Format (Quicktime and MPEG are trademarks). Indeed, DASH is agnostic to the encapsulation format.

For the sake of illustration, an encapsulation using the ISO Base Media file format defined in the context of the MPEG standardization activity is considered in the following.

In particular, the encapsulation file format may relate to the standardization of the encapsulation of the High Efficiency Video Coding (HEVC) and its scalable extension in the ISO Base Media File Format (ISO/IEC 14496 Part 15). ISO/IEC 14496-15 contains a section describing the encapsulation of HEVC tiles as one or more tile regions corresponding, for example to a region of interest, or simply consisting in a partitioning of the video frames and providing a spatial access into the video stream.

It is to be noted that extraction/streaming and displaying of regions of interest relying on tile composition is particularly useful for enabling interactive high quality zoom-in functions during streaming, for example by allowing a user to click on specific areas in video sequences to give access to a higher resolution video for the specific selected areas.

It is to be recalled that video resolution continuously increases, going from standard definition (SD) to high definition (HD), and to ultra-high definition (e.g. 4K2K or 8K4K). Video sequences can be encoded using either a single-layer (e.g. HEVC) or a multi-layer (e.g. Scalable HEVC) coding standard. In case of multi-layer coding format, a given layer can be used as reference data for one or more other layers. The layered video organization can be efficiently represented using multiple dependent media content components, each media content component representing a video layer at a different level of scalability. In order to decode a given media content component, a client device must have access to the media content component itself but also to all media content components it depends on.

It is also to be recalled that there is a proliferation of mobile and connected devices with video streaming capabilities. Accordingly, splitting or partitioning the video sequences into tiles or spatial parts becomes important if a user of a mobile device wants to display or wants to focus on sub-parts of a video sequence by keeping or even improving the quality. By using tiles, a user can therefore interactively request spatial sub-parts of the video sequence. In case of scalable video coding format (e.g. scalable HEVC or multi-view HEVC), each video layer can be organized into multiple independent spatial sub-parts except that coding dependencies may exist between tiles of an enhancement layer and one or more tiles of a base layer. Tiles may also be organized as a set of related media components, all depending on another media component containing common information to all the tiles. Typically, when considering ISO Base Media File Format, this corresponds respectively to the tile tracks and the tile base track. While in the first applications of DASH, client apparatuses used to download one representation per media type at a time, more evolved scenario start to appear like the one addressed in the following according to which several representations of a given media type are streamed simultaneously. There are such use cases for next generation audio where multiple audio streams can be streamed and rendered at the same time to provide a better user experience. A specific descriptor has been defined in the DASH manifest to describe such use case. This is also the case with video where a user can select multiple parts of video to be streamed simultaneously to be rendered into a composite or assembled or aggregated video. This is typically the case for video streams organized into spatial sub parts and compressed at different quality levels as depicted in FIG. 1a. These spatial sub-parts can be described with the Spatial Relationship Description feature of DASH, as the example illustrated in FIG. 2. A user can select a region of interest (ROI) in a bigger video and decide to focus on this region of interest.

The paper entitled "Design and evaluation of tile selection algorithms for tiled HTTP adaptive streaming" by Jens Devloo et al., 2013, Lecture Notes in Computer Sciences, Vol. 7943, pages 25-36, discloses pre-configured client adaptation logics depending on the scenario of use for large videos, for example panorama videos. In one of the considered scenarios, allowing panning and zooming, the authors present a multiple stream approach where a low quality version is always streamed to the client and only some parts, depending on the available bandwidth, are streamed to the client with high quality. Then, according to a visibility criterion, i.e. whether a spatial sub part covers or not a region of interest for the user, the client, through a tile requester, downloads first the visible spatial sub-parts. Then, depending on the remaining bandwidth, the client also downloads high quality for other spatial sub-parts that are close to the region of interest.

However, while such a solution is efficient in terms of use of bandwidth, the inventors have observed that the user experience may be questionable.

Therefore, it may be desired to improve the existing solutions so as to improve rendering quality during streaming of timed media data

SUMMARY OF THE INVENTION

The present invention has been devised to address one or more of the foregoing concerns.

In this context, there is provided a solution for improving rendering display during streaming of timed media data comprising images, between a server apparatus and a client apparatus.

According to a first object of the invention, there is provided a method for improving rendering display during streaming of timed media data comprising images, between a server apparatus and a client apparatus, the method being implemented in the server apparatus and comprising the steps of, obtaining a quality information related to a quality disparity between portions of an image of the timed media data; and transmitting at least a first and a second item of data belonging to at least a first and a second portion of an image to be at least partially displayed, respectively, the quality disparity between the portions of image corresponding to the first and second items of data being compliant with the obtained quality information.

The method of the invention makes it possible to improve the rendering display during streaming of timed media data by avoiding or reducing perceptible quality jumps between portions of images, for example between a region of interest and its surrounding portions.

According to particular embodiments, a portion of an image is the entire image.

In an embodiment, the quality information is representative of a quality disparity threshold between two portions of an image of the timed media data.

In an embodiment, the timed media data are partitioned timed media data, the first and the second item of data belonging to two adjacent portions of the same image. A portion of an image may be a partition of an image.

In an embodiment, images of the timed media data are encoded according to at least a first and a second layer, the first and the second item of data belonging to different layers and the quality information being related to a quality disparity between portions of different layers of an image of the timed media data.

In an embodiment, the first and the second items of data belong to different images and the quality information is related to a quality disparity between portions of different images of the timed media data.

In an embodiment, the method further comprises a step of transmitting a manifest, the manifest comprising information describing data of timed media data available for streaming and the quality information.

In an embodiment, the quality information is at least partially encoded in the manifest as a set of possible combinations of data of timed media data available for streaming, each combination of data being compliant with the quality disparity.

In an embodiment, the quality information is at least partially encoded in the manifest as a quality rule making it possible for the client apparatus to determine whether data of timed media data available for streaming are compliant with the quality disparity.

In an embodiment, the manifest further comprises at least one quality descriptor associated with data of timed media data available for streaming, the at least one quality descriptor signaling the data which are of the same quality, the at least one quality descriptor being used for applying the quality rule.

In an embodiment, the manifest further comprises quality rank attributes for classifying different quality levels available for the same timed media data, the quality rank attributes being used for applying the quality rule.

In an embodiment, the transmitted first or second item of data are pushed data, following main data sent from the server apparatus to the client apparatus, in response to a main request from the client.

According to a second object of the invention, there is provided a method for improving rendering display during streaming of partitioned timed media data comprising images, between a server apparatus and a client apparatus, the method being implemented in the client apparatus and comprising the steps of, obtaining a quality information related to a quality disparity between portions of an image of the partitioned timed media data; and requesting at least a first and a second item of data belonging to at least a first and a second portion of an image to be at least partially displayed, respectively, the quality disparity between the portions of image corresponding to the first and second items of data being compliant with the obtained quality information.

The method of the invention makes it possible to improve the rendering display during streaming of timed media data by avoiding or reducing perceptible quality jumps between portions of images, for example between a region of interest and its surrounding portions.

According to particular embodiments, a portion of an image is the entire image.

In an embodiment, the quality information is representative of a quality disparity threshold between two portions of an image of the timed media data.

In an embodiment, the timed media data are partitioned timed media data, the first and the second item of data belonging to two adjacent portions of the same image. A portion of an image may be a partition of an image.

In an embodiment, images of the timed media data are encoded according to at least a first and a second layer, the first and the second item of data belonging to different layers and the quality information being related to a quality disparity between portions of different layers of an image of the timed media data.

In an embodiment, the first and the second items of data belong to different images and the quality information is related to a quality disparity between portions of different images of the timed media data.

In an embodiment, the method further comprises a step of receiving a manifest, the manifest comprising information describing data of timed media data available for streaming and the quality information.

In an embodiment, the quality information is at least partially encoded in the manifest as a set of possible combinations of data of timed media data available for streaming, each combination of data being compliant with the quality disparity, the method further comprising a step of selecting one possible combination of data and a step of requesting the data of the selected combination.

In an embodiment, the quality information is at least partially encoded in the manifest as a quality rule making it possible for the client apparatus to determine whether data of timed media data available for streaming are compliant with the quality disparity, the method further comprising a step of applying the quality rule to select data and a step of requesting the selected data.

In an embodiment, the quality information is obtained independently from the server apparatus.

In an embodiment, the manifest further comprises at least one quality descriptor associated with data of timed media data available for streaming, the at least one quality descriptor signaling the data which are of the same quality, the at least one quality descriptor being used for applying the quality rule.

In an embodiment, the manifest further comprises quality rank attributes for classifying different quality levels available for the same timed media data, the quality rank attributes being used for applying the quality rule.

According to a third object of the invention, there is provided a device for improving rendering display during streaming of timed media data comprising images, between a server apparatus and a client apparatus, the device being within the server apparatus and comprising a microprocessor configured for carrying out the steps of, obtaining a quality information related to a quality disparity between portions of an image of the timed media data; and transmitting at least a first and a second item of data belonging to at least a first and a second portion of an image to be at least partially displayed, respectively, the quality disparity between the portions of image corresponding to the first and second items of data being compliant with the obtained quality information.

The device of the invention makes it possible to improve the rendering display during streaming of timed media data by avoiding or reducing perceptible quality jumps between portions of images, for example between a region of interest and its surrounding portions.

According to particular embodiments, a portion of an image is the entire image.

In an embodiment, the quality information is representative of a quality disparity threshold between two portions of an image of the timed media data.

In an embodiment, the timed media data are partitioned timed media data, the first and the second item of data belonging to two adjacent portions of the same image. A portion of an image may be a partition of an image.

In an embodiment, images of the timed media data are encoded according to at least a first and a second layer, the first and the second item of data belonging to different layers and the quality information being related to a quality disparity between portions of different layers of an image of the timed media data.

In an embodiment, wherein the first and the second items of data belong to different images and the quality information is related to a quality disparity between portions of different images of the timed media data.

In an embodiment, the microprocessor is further configured for carrying out a step of transmitting a manifest, the manifest comprising information describing data of timed media data available for streaming and the quality information.

In an embodiment, the quality information is at least partially encoded in the manifest as a set of possible combinations of data of timed media data available for streaming, each combination of data being compliant with the quality disparity.

In an embodiment, the quality information is at least partially encoded in the manifest as a quality rule making it possible for the client apparatus to determine whether data of timed media data available for streaming are compliant with the quality disparity.

In an embodiment, the manifest further comprises at least one quality descriptor associated with data of timed media data available for streaming, the at least one quality descriptor signaling the data which are of the same quality, the at least one quality descriptor being used for applying the quality rule.

In an embodiment, the manifest further comprises quality rank attributes for classifying different quality levels available for the same timed media data, the quality rank attributes being used for applying the quality rule.

In an embodiment, the transmitted first or second item of data are pushed data, following main data sent from the server apparatus to the client apparatus, in response to a main request from the client.

According to a fourth object of the invention, there is provided a device for improving rendering display during streaming of partitioned timed media data comprising images, between a server apparatus and a client apparatus, the device being within the client apparatus and comprising a microprocessor configured for carrying out the steps of, obtaining a quality information related to a quality disparity between portions of an image of the partitioned timed media data; and requesting at least a first and a second item of data belonging to at least a first and a second portion of an image to be at least partially displayed, respectively, the quality disparity between the portions of image corresponding to the first and second items of data being compliant with the obtained quality information.

The device of the invention makes it possible to improve the rendering display during streaming of timed media data by avoiding or reducing perceptible quality jumps between portions of images, for example between a region of interest and its surrounding portions.

According to particular embodiments, a portion of an image is the entire image.

In an embodiment, the quality information is representative of a quality disparity threshold between two portions of an image of the timed media data In an embodiment, the timed media data are partitioned timed media data, the first and the second item of data belonging to two adjacent portions of the same image. A portion of an image may be a partition of an image.

In an embodiment, images of the timed media data are encoded according to at least a first and a second layer, the first and the second item of data belonging to different layers and the quality information being related to a quality disparity between portions of different layers of an image of the timed media data.

In an embodiment, the first and the second items of data belong to different images and the quality information is related to a quality disparity between portions of different images of the timed media data.

In an embodiment, the microprocessor is further configured for carrying out a step of receiving a manifest, the manifest comprising information describing data of timed media data available for streaming and the quality information.

In an embodiment, the quality information is at least partially encoded in the manifest as a set of possible combinations of data of timed media data available for streaming, each combination of data being compliant with the quality disparity, the microprocessor being further configured for carrying out a step of selecting one possible combination of data and a step of requesting the data of the selected combination.

In an embodiment, the quality information is at least partially encoded in the manifest as a quality rule making it possible for the client apparatus to determine whether data of timed media data available for streaming are compliant with the quality disparity, the microprocessor being further configured for carrying out a step of applying the quality rule to select data and a step of requesting the selected data.

In an embodiment, the quality information is obtained independently from the server apparatus.

In an embodiment, the manifest further comprises at least one quality descriptor associated with data of timed media data available for streaming, the at least one quality descriptor signaling the data which are of the same quality, the at least one quality descriptor being used for applying the quality rule.

In an embodiment, the manifest further comprises quality rank attributes for classifying different quality levels available for the same timed media data, the quality rank attributes being used for applying the quality rule.

There is also provided a processing method for descriptive data that describes information regarding media content components, the method comprising steps of:
  generating the descriptive data, and
  transmitting the generated descriptive data to a client,
  wherein the descriptive data includes:
    at least two adaptation sets;
    ranking information for identifying a quality ranking of each of a plurality of media content components which are belonging to each adaptation set;
    ranking relation information for indicating a relationship between at least two pieces of ranking information for the at least two adaptation sets, and
    address information which is referred by the client for requesting a media content component.

There is also provided a processing apparatus for processing descriptive data that describes information regarding media content components, the processing apparatus being configured to perform the steps of:
  generating the descriptive data, and
  transmitting the generated descriptive data to a client, wherein the descriptive data includes:
  at least two adaptation sets;
  ranking information for identifying a quality ranking of each of a plurality of media content components which are belonging to each adaptation set;
  ranking relation information for indicating a relationship between at least two pieces of ranking information for the at least two adaptation sets, and
  address information which is referred by the client for requesting a media content component.

There is also provided a method for processing descriptive data, the descriptive data providing information regarding one or more alternative versions of one or more media content components, the method comprising the following steps:
  generating descriptive data, and
  transmitting the generated descriptive data to a client, wherein the descriptive data comprises:
  at least two adaptation sets each comprising one or more alternative versions of one or more media content components;
  first information identifying, for each adaptation set, a quality ranking of each alternative version of the one or more media content components;
  second information indicating a relationship between first information associated with the at least two adaptation sets, and
  third information indicating one or more addresses which is each referred to by the client for requesting one of the one or more alternative versions of the media content components.

There is also provided a device for processing descriptive data, the descriptive data providing information regarding one or more alternative versions of one or more media content components, the device being configured to perform the following steps:
  generating descriptive data, and
  transmitting the generated descriptive data to a client, wherein the descriptive data comprises:
  at least two adaptation sets each comprising one or more alternative versions of one or more media content components;
  first information identifying, for each adaptation set, a quality ranking of each alternative version of the one or more media content components;
  second information indicating a relationship between first information associated with the at least two adaptation sets, and
  third information indicating one or more addresses which is each referred to by the client for requesting one of the one or more alternative versions of the media content components.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which:

FIG. 1, comprising FIGS. 1a and 1b, illustrates an example of a partitioned frame of video wherein the video sequence is encoded into three quality levels and examples of video compositions, respectively;

FIG. 5, comprising

FIG. 6, comprising FIGS. 6a to 6d, illustrates examples of manifests according to the "content creator" embodiments, when using a quality rule descriptor, and when using a quality equivalence descriptor;

DETAILED DESCRIPTION OF EMBODIMENTS OF THE INVENTION

Figure 2:
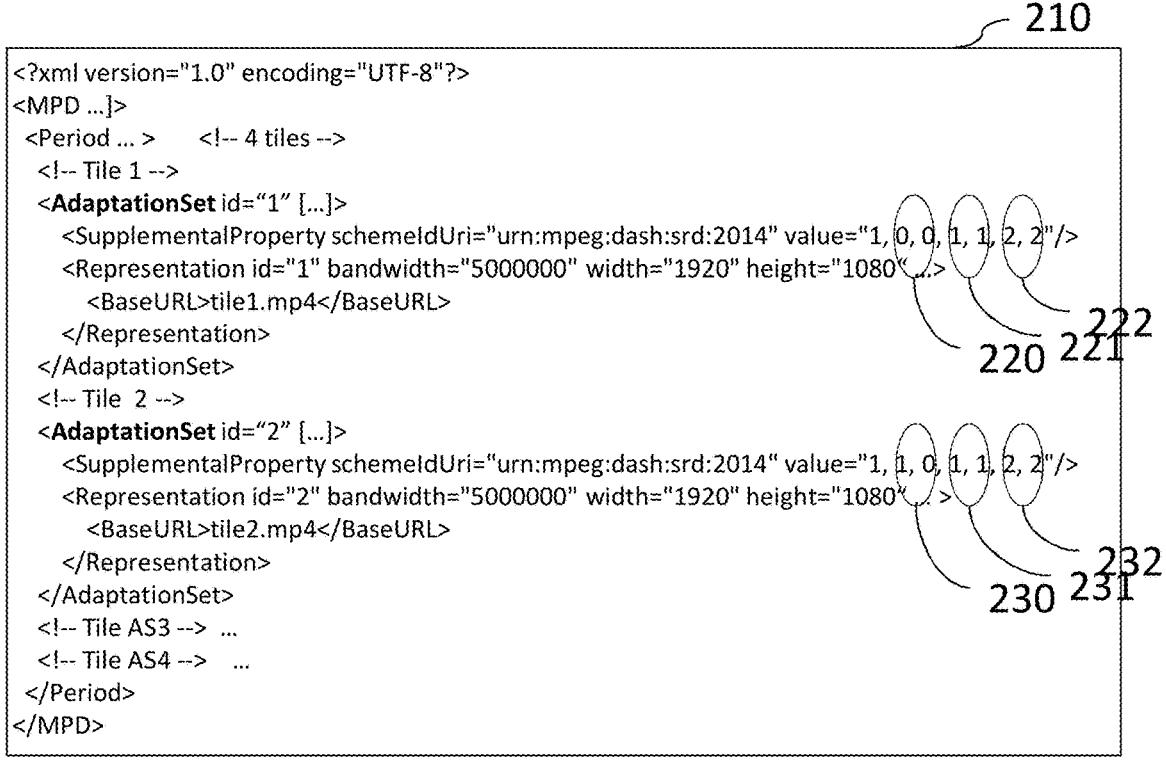
FIG. 2 illustrates an example of a streaming manifest describing spatial parts or tiles in a video bit-stream.

For the sake of illustration, it is considered in the following that a "media component" (or a "media content component") is an item of data of a media stream of a specific media type (e.g. audio, video, text, or metadata). According to MPEG DASH, a media component is defined as "one continuous component of the media content with an assigned media component type". In the followings, a media component is used in a more generic way than the Content-Component element in DASH.

Still for the sake of illustration, it is considered in the following that a "tile" is a spatial part (or a partition or a subpart) of one or more images. The images can be frames of a video bit-stream (as illustrated in FIG. 1a) or just one compressed still image, whatever the encoding format. A tile is defined by a position (x, y) and a size (width (w), height (h)). By default, a tile is static that is to say that for each frame of the video sequence, the position and size of the tile remains the same. However, dynamic tiles can be used, wherein their position and/or size change along the sequence, on a frame basis, or on temporal segments basis. According to MPEG DASH, a tile is a rectangular region of coding tree blocks (coding entities) within a particular tile column (x position) and a particular tile row (y position) in a picture.

A "tile region" is generally a rectangular area in a picture also defined by (x, y, w, h). As for tiles, a tile region can be fixed along the video sequence or not. According to ISO BMFF, a tile region represents one or more complete HEVC tiles in one or more complete slice segments that are within the same coded picture and that contain no other HEVC tiles.

Still for the sake of illustration, it is considered in the following that a "Region of interest" (or "ROI") is similar to one or more tile regions. According to ISO BMFF, the data corresponding to a region of interest may be encapsulated in one track containing both data for the ROI and non-ROI, in one track corresponding to a tile region or as multiple tracks, each containing data for each tile region that the ROI covers.

A combination, composition, or bundle is a set of media content components intended to be jointly rendered.

Still for the sake of illustration, it is considered in the following that a "composed video or image" is a video bundle or combination or a combination of video content components. It is a video or a, image resulting from the stitching, the composition, or the assembly of at least two video frame portions or image portions. A video frame portion or an image portion may correspond to a tile, a tile region, or a ROI . . . as well as the image portion. This makes it possible to render a stitching, a composition, or an assembly of at least two video frame portions or image portions in a single frame or image displayed by a user apparatus.

Finally, a "quality rule" is considered in the following as hints that provide constraints or parameters for quality-based selection. As described hereafter, an example of quality rule is the max_quality_degradation.

According to particular embodiments, the description capabilities of the format used for describing data that can be streamed, for example MPEG DASH, are extended so that a content author can specify some guidance for quality adaptation of each tile when several tiles are selected by a streaming client. For the sake of illustration, it may be indicated in a streaming manifest that a quality degradation between two adjacent video frame portions or image portions cannot be greater than a predetermined threshold. Such an item of information may be used by a client apparatus to select tiles to be streamed (i.e. a combination of tiles that comply with such a quality rule). This leads to an acceptable quality of both the ROI and the surrounding tiles. These description capabilities include a quality degradation pattern plus an indication of equivalent Representations across Adaptation Sets that store a tile.

While there exist many embodiments of the invention, three particular embodiments are described in the following.

According to a first embodiment, a streaming manifest comprises information making it possible for a client apparatus to determine a combination of tiles that comply with the quality rules. This can be done by signaling a quality rule in the manifest and associating equivalent media components in the manifest so that a client apparatus can determine and select combination of tiles that comply with the quality rule.

According to a second embodiment, referred to as "content creator" in the followings, the combinations of tiles that comply with the quality rule are determined a priori, that is to say before transmitting a streaming manifest. This can be done offline by the content authors at a content packaging stage. The combinations that comply with the quality rule may be described in the streaming manifest so that a client apparatus may select one of them.

This can also be done by using a modified adaptation logic at the streaming client apparatus end to handle multiple components of the same media type at a time, activated for example according to user choice in a viewing mode.

According to a third embodiment, referred to as "server control" in the following, the server apparatus is aware of the quality rule that is not transmitted to the client apparatus. Accordingly, the server apparatus takes initiative, on a client request for a media component of interest to suggest (redirection) or send (push) versions of surrounding media components.

FIG. 1, comprising FIGS. 1a and 1b, illustrates an example of a partitioned frame of video wherein the video sequence is encoded into three quality levels and examples of video compositions, respectively FIG. 1 a illustrates an example of a partitioned frame of video (only one frame is illustrated for the sake of clarity but all the frames of the video sequence can have the same partitioning into tiles) wherein the video sequence is encoded into three quality levels: high ("HQ"), mid ("MO"), and low ("LQ") denoted 100, 110, and 120, respectively.

Each quality level can be encoded as an independent video bit-stream. Alternatively, each quality level can be a scalability layer of another layer. For the sake of illustration, the high quality frame 100 can be a quality enhancement layer of an enhancement layer corresponding to mid quality frame 110 that is an enhancement layer of a base layer corresponding to low quality frame 120.

The layer with lowest quality is referred to as the base layer (corresponding to low quality frame 120 in the example of FIG. 1). Each quality level or layer can be encoded as a set of independent tiles like tiles 101 and 102.

In a particular embodiment, the tiles are HEVC tiles with no dependencies to other tiles. This makes it possible to assemble a set of selected tiles (for example selected set 105) into a single video bit-stream that a single HEVC decoder can decode and display.

The use of independent tiles and/or of non-HEVC encoded is also possible. For example, each tile may be encoded in its own video bit-stream, possibly in another encoding format than HEVC (e.g. AVC or VP9).

For encoding the data into scalable layers, SHVC, SVC or any scalable or layered coding format can be used. The client apparatus then needs to either do some stream reassembling to feed a single decoder or to use multiple decoders to play the composed video resulting from the selected set of tiles.

Whatever the encoding format used, this encoding format is described in encapsulated media stream and is exposed in the streaming manifest so that a client apparatus can determine if it can play the media file and select the one it prefers when multiple encoding formats are available.

FIG. 1b illustrates some examples of video compositions that can benefit from the invention to produce smooth quality on the composed videos. For example the composed video 150 results from the juxtaposition of spatial parts of 2 distinct video bit-streams. These bit-streams can be different versions of a same scene or can even be video bit-streams from different scenes.

The composed video 160 consists in assembling parts of the same video at different qualities. The video bit-streams representing videos 161 and 162 can be independent video bit-streams or layers of a scalable bit stream. They can even be encoded in different formats (thus requiring multiple video decoders at client side), the encoding format being conveyed in ISO BMFF and exposed in @codecs DASH attribute.

It is to be noted that the different partitions depicted in FIG. 1b do not mean that videos are tiled. The extraction of one spatial part (1, 2, 3, or 4) can result from a crop operation and the cropped part is pasted into the composite video either directly or through layering (the resulting composed video can have several layers, i.e. some parts in lower layers are hidden by higher layers).

For such layered composed video and considering the example 160, the spatial part 1 coming from video 162 is placed at the higher layer while other spatial parts from (or even the whole) video 161 are placed at lower layer.

FIG. 2 illustrates an example of a streaming manifest describing spatial parts or tiles in a video bit-stream. In the particular case of MPEG DASH, one Spatial Relationship Descriptor (SRD) can be associated with the description of each tile, tile region, or spatial part.

For the sake of illustration, a video 200 is partitioned into 4 tiles. An example of corresponding DASH MPD manifest 210 illustrates the description of each spatial part (tiles 1, 2, 3, and 4) with SRD. Still for the sake of illustration, only the MPD description for tiles 1 and 2 is shown.

A first Adaptation Set having identifier id="1" corresponds to the description of tile 1. It contains one Representation with a resolution of 1920×1080 pixels (one quarter of the full video frame). A SRD descriptor (using Supplementa/Property descriptor) specifies that this video is a spatial part of a video (not described in the manifest) with source_id (first parameter of the "value" attribute) equal to 1, with position of its top-left corner, denoted 220, at (0, 0) of the reference frame associated to the source_id equal to 1. The size of this spatial part represents the half of the reference frame in each direction (width and height denoted 221 cover 1 over the 2 arbitrary units of the reference frame denoted 222). It can be deduced from the SRD descriptor that the whole reference space indeed represents a 4k2k video (3840×2160 pixels).

As set forth in the SRD descriptor of a second Adaptation Set having identifier id="2", this Adaptation Set contains the description of another spatial part (tile 2). This SRD descriptor uses the SupplementalPropertydescriptor to specify that the tile pertains to the same reference frame than the first Adaptation Set (same source_id=1) and that it is located at mid-range on x-axis (value 1 over 2) and on the base of the y-axis (value 0), as illustrated with reference 230, with the same sizes as the first tile, as illustrated with references 231 and 232.

Using a similar SRD-based approach, the video frame illustrated in FIG. 1 can be represented as 9 Adaptation Sets, one per tile, each containing three alternative Representation elements describing the video bit-stream of each quality level.

From FIG. 1 and FIG. 2, it can be seen that a streaming client apparatus is informed on the different versions of video streams with their spatial relationships. However, no information is provided on their respective quality and how to adapt when bandwidth varies. For example when a user apparatus selects the tile region 105 on FIG. 1, it cannot be determined whether or not the network bandwidth allows the streaming of the media segments corresponding to ROI 105 plus the media segments surrounding this ROI 105 at the same high quality level.

While different combinations and different adaptation strategies are actually possible, the client has to decide rapidly (to avoid buffer starvation and display freeze) which combinations should be used in view of network bandwidth and rendering quality. This can be done according to different strategies: when preparing the content data, by using advanced client apparatuses having dedicated adaptation logic, by using standard client apparatus processing appropriate signaling in streaming manifests, or by quality-aware server apparatuses that help the client in selecting or in streaming appropriate combinations.

Figure 3:
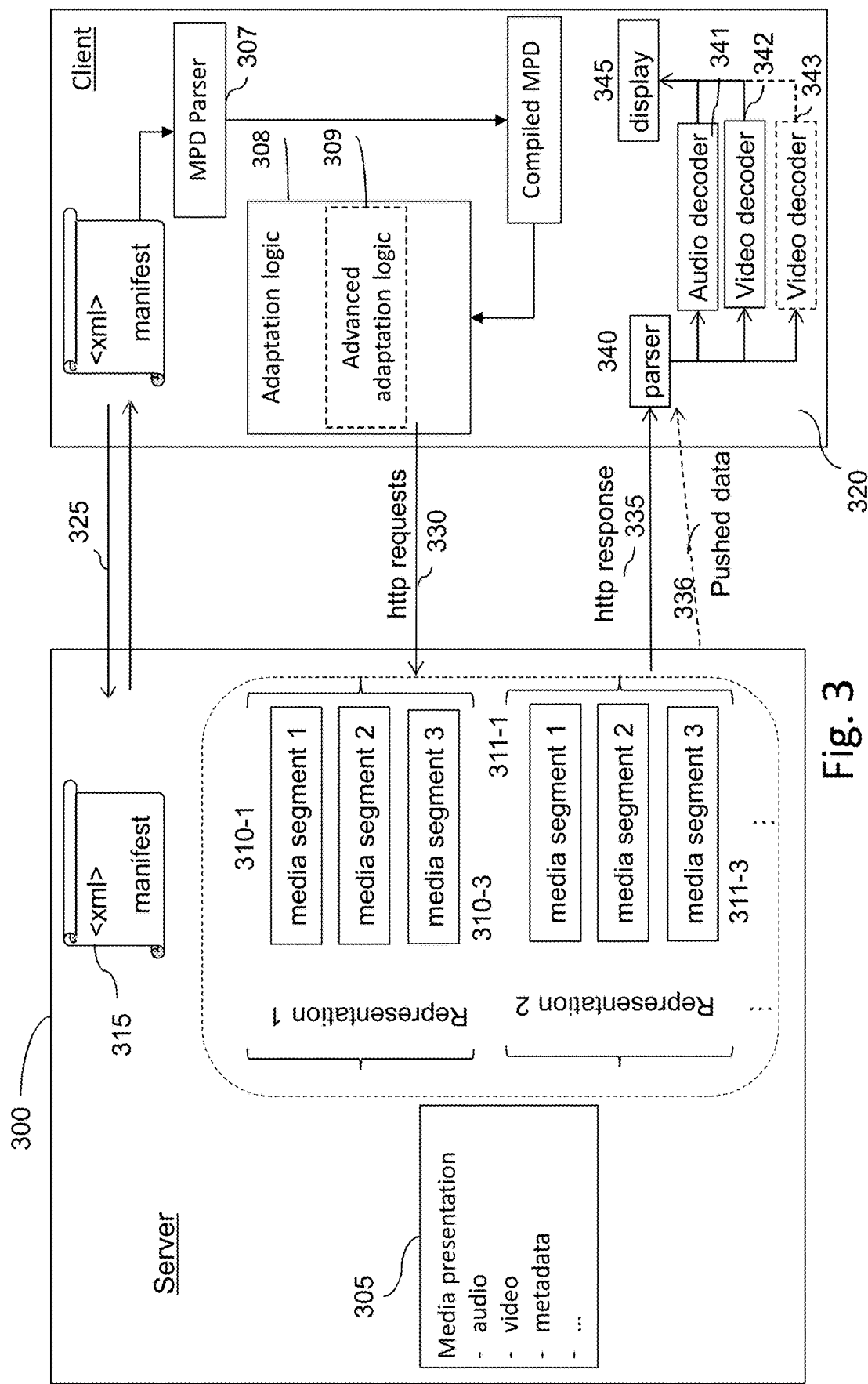
FIG. 3 illustrates a DASH server apparatus and a client apparatus making it possible to implement embodiments of the invention

FIG. 3 illustrates a DASH server apparatus and a client apparatus making it possible to implement embodiments of the invention.

As illustrated, media server apparatus 300 comprises media presentations among which, in particular, media presentation 305 that contains different media content components, e.g. audio and video data streams. Audio and video streams can be interleaved or stored independently. The media presentation can propose alternative versions of the same media content components (with different bitrate, quality, resolution, sampling rate, a different point of view in omnidirectional media like for example 360° video, etc.).

For example, the media content components of this media presentation are encapsulated according to the ISO Base Media File Format and described and streamed according to DASH recommendations. As a result of an encapsulation step, each alternative version (or Representation in DASH context e.g. Representation 1 and Representation 2) is temporally split into small independent and consecutive temporal media segments (e.g. temporal media segments 310-1 to 310-3 and 311-1 to 311-3, respectively), for example media segments conforming the DASH and ISO Base Media File Format standards (respectively ISO/IEC 23009-1 and ISO/IEC 14496 Parts 12 and 15), that can be addressed and downloaded independently. Each media segment may contain one or more media content components depending on whether the content is multiplexed or not. Addresses (i.e. HTTP URL addresses in the illustrated example) are set by server apparatus 300 for all the media segments and a manifest 315 describing the media presentation is created (as described, for example, in reference to FIG. 5a).

It is to be recalled that a manifest, for example a MPD, is a document, typically an XML file (or even a plain text file, for HTTP Live Streaming), that describes all the media content components that can be accessed for a given media presentation. Such a description may comprise the types of the media content components (for example audio, video, audio-video, metadata, or text), the durations of the media segments, and the addresses (e.g. the URL) associated with the media segments, that is to say the addresses from which the media content components can be obtained. The media content components can be described as alternative versions of the same content or as parts of a same content (for example spatial parts, regions of interest or tiles of a video with SRD or a viewport in virtual reality or omnidirectional media content) or as parts of a "media experience" that describes content components intended to be presented or displayed together.

Figure 4:
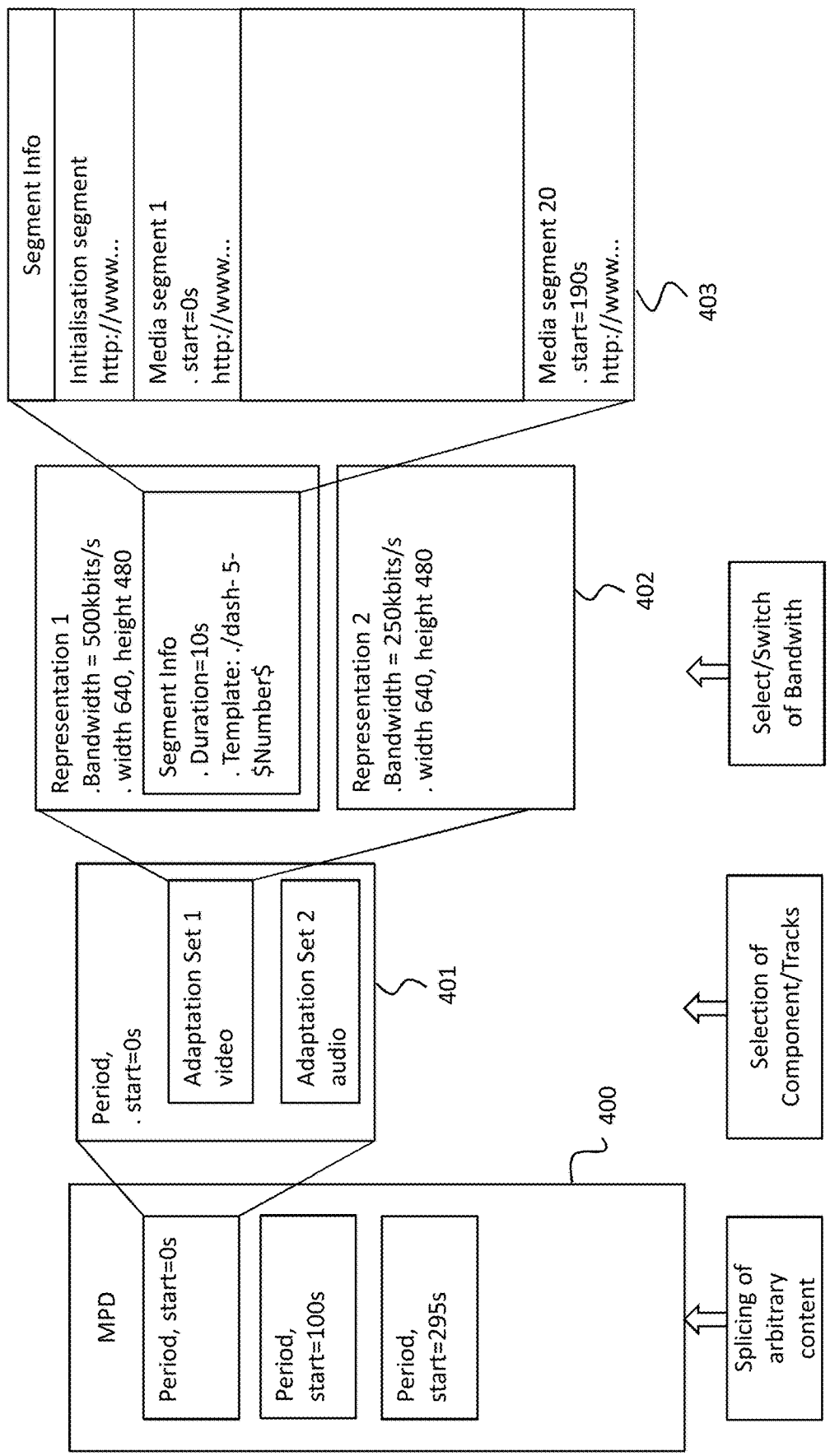
FIG. 4 illustrates a typical description of a media presentation in DASH according to the MPEG DASH specification.

Typically, an MPD is based on a hierarchical data model as depicted in FIG. 4.

FIG. 4 illustrates a typical description of a media presentation in DASH according to the MPEG DASH specification.

As illustrated, it mainly consists in one or several periods, denoted 400, that are each described by a Period element, each Period element having a starting time and duration. In turn, each Period element mainly consists in one or several Adaptation Set elements, denoted 401.

An Adaptation Set element provides information about one or multiple media content components and its various encoded alternatives as illustrated with reference 402. Each encoded alternative of the same media content component is referred to as a Representation that typically consists in one or several media and/or initialization segments denoted 403.

Turning back to FIG. 3 and for the sake of illustration, only one example of an Adaptation Set from media presentation 305 is illustrated in conjunction with server apparatus 300. According to the illustrated example, this Adaptation Set contains two alternative versions, denoted 310 and 311, of the same content of a given media type, being observed that a media segment may also contain multiplexed data of different media types. Each version is split into consecutive temporal media segments, for example into three consecutive temporal media segments 310-1 to 310-3 and 311-1 to 311-3, corresponding to three consecutive time intervals.

Such a manifest file can be sent to the client apparatus 320 (step 325), typically over HTTP.

After having been received, manifest file 315 is analyzed by parser 307 of the client apparatus to determine which presentations are available and which media segments 310-1 to 310-3 and 311-1 to 311-3 of media presentation 305 are accessible.

Manifest file 315 is also used to determine the http addresses of these media segments and the relations between these media segments. It is to be noted here that the description file 315 and the media segments generically denoted 310 and 311 can be stored on different servers. Moreover, manifest file 315 gives items of information about the content of the media presentation through the use of descriptors, for example the <Role> element or the <Label> element or through generic descriptor like <EssentialProperty> or <SupplementalProperty> elements. These items of information may comprise a resolution, a bit-rate, and similar information.

In view of the received description, the adaptation logic module 308 of the client apparatus 320 can therefore select media segments from appropriate versions to send corresponding http requests (step 330) for downloading these media segments.

In response, server apparatus 300 transmits the requested temporal media segments (step 335). These temporal media segments, received in http response 335, can be parsed (or de-encapsulated) by a parser module 340 (for example a mp4 or an ISOBMFF reader) and each media stream is sent to the appropriate media decoder 341 and 342. There is at least one decoder per media type (e.g. decode 341 for audio and decoder 342 for video) and optionally several additional decoders for a media type, for example 343 for video. There could be as well additional decoders for other media types like audio for example.

At the end, the decoded media streams are rendered in a display module 345. Sometimes the display module 345 includes a transformation process, for instance to project a panorama image into a new reference frame (display reference frame), or clipping module to fit a big image into a small display window or post-processing capabilities to apply filters onto the decoded images for example.

It is to be noted that server apparatus 300 may consist in separate server apparatuses or devices, each performing one or more of the following steps:
  generation of the media content,
  encapsulation of the media stream in file format,
  generation of the streaming manifest or playlist file,
  transmission of the media presentation, and
  transmission of media content, most often as content segments.

The client apparatus may thus issue requests for the manifest to a first server apparatus, for example an application server apparatus and requests for the media content to one or more other server apparatuses, for example media server apparatuses or streaming server apparatuses. The server apparatus which transmits the media samples may be also different, for example if media data are delivered through a CDN (Content Delivery Network).

According to particular embodiments, the server apparatus 300 is an HTTP/2 server apparatus supporting push Directives from DASH Part-6. In such a case, some data can be pushed like to the client apparatus 320, as illustrated with reference 336, provided that the client apparatus also supports HTTP/2 and advantageously the DASH Part-6 (being noted that supporting DASH-Part-6 is not required for implementing the invention, except for specific embodiments referred to as "server control").

Figure 5A:
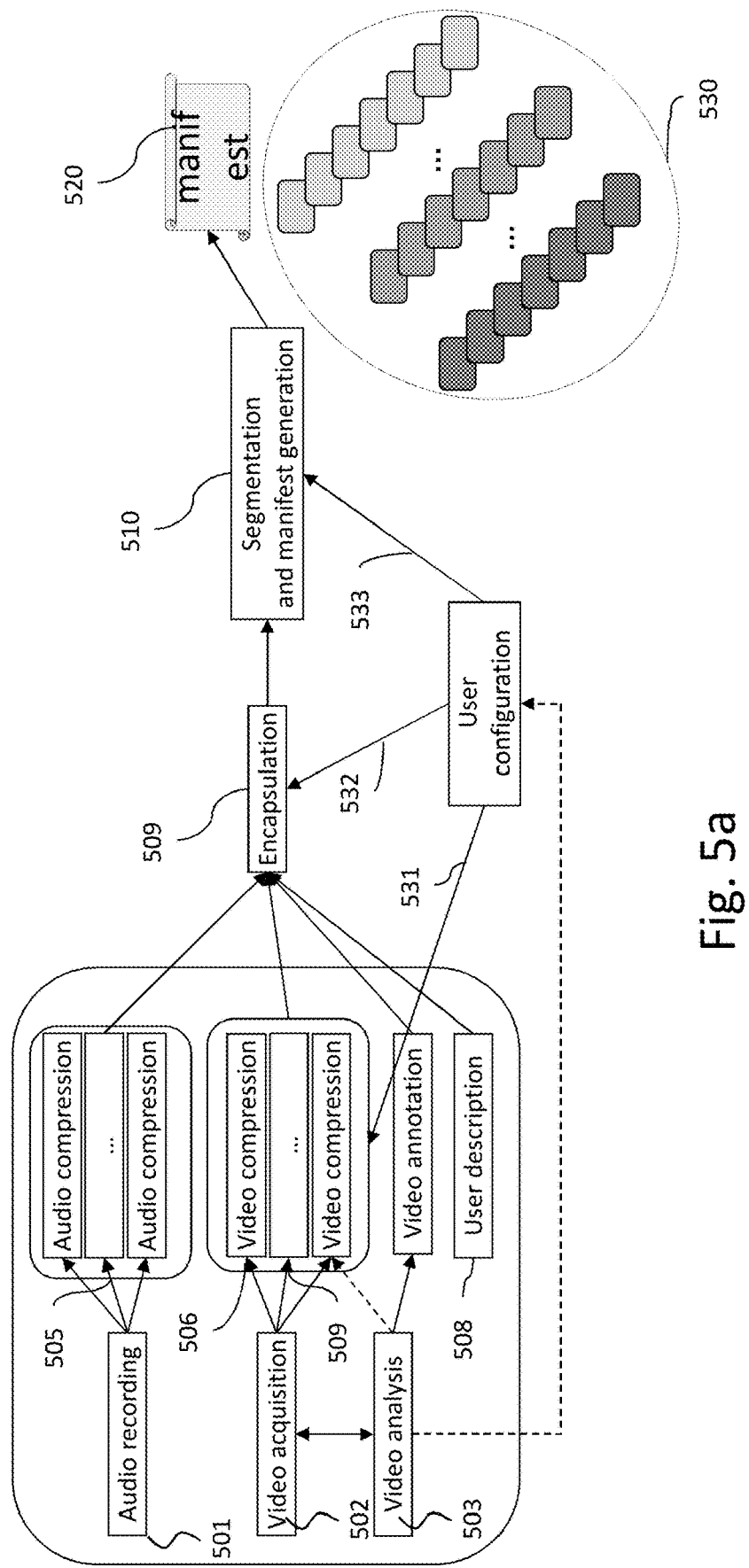
FIGS. 5a and 5b, illustrates the use of quality rules for improving rendering quality during streaming of media data from a server apparatus perspective and a client apparatus perspective, respectively.
Figure 5B:
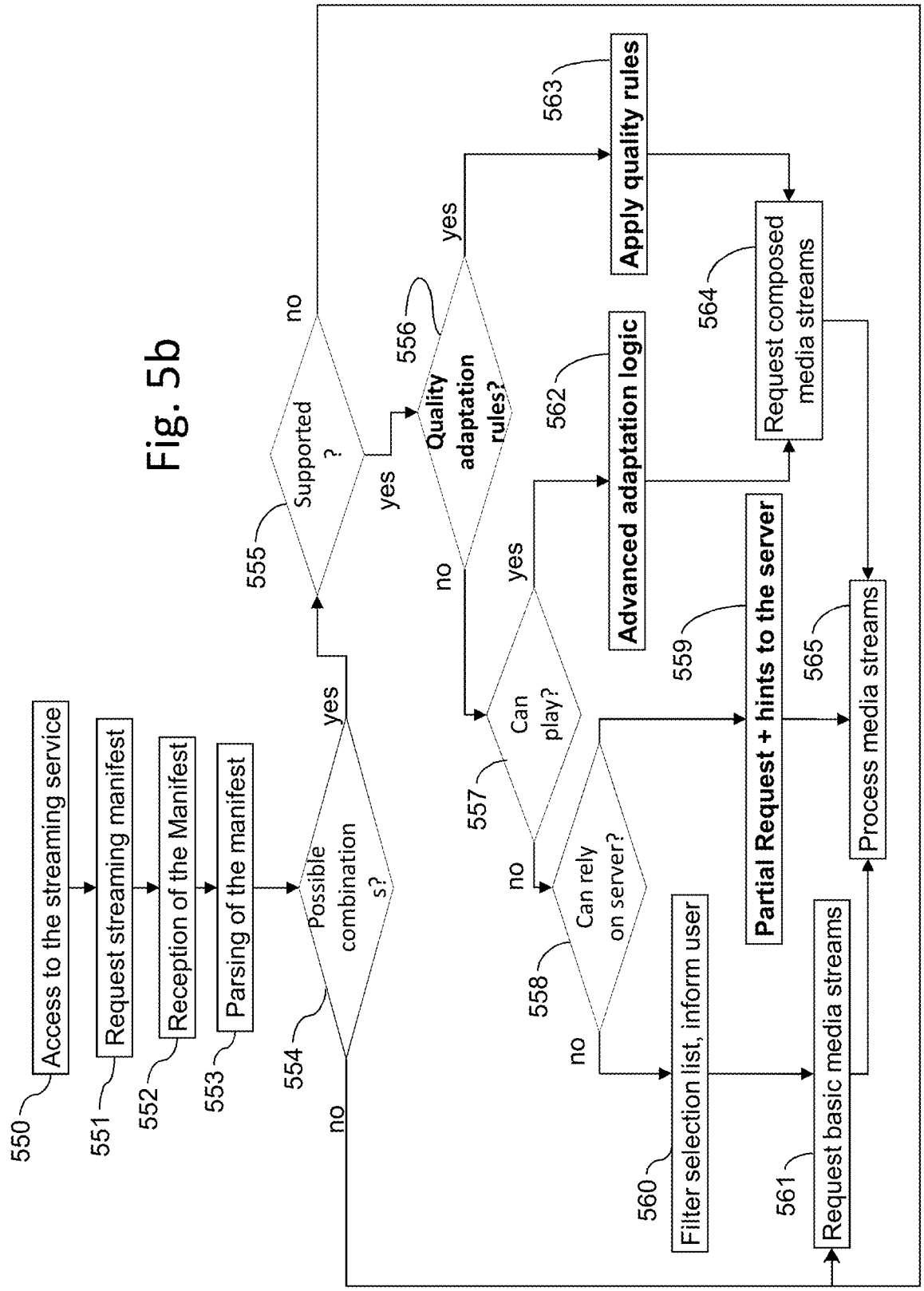

FIG. 5, comprising FIGS. 5a and 5b, illustrates the use of quality rules for improving rendering quality during streaming of media data from a server apparatus perspective and a client apparatus perspective, respectively.

FIG. 5a illustrates different alternatives directed to the preparation of media stream, by content data authors, for delivery, according to the "content generation" embodiment.

As illustrated, a first step of such embodiments is directed to recording multimedia content also called media presentation, for example audio recording (step 501) and video recording (step 502).

The recorded multimedia content can then be optionally processed in a video analysis module 503 to extract some features, in particular from the video data, that the user can exploit to control the audio and/or video encoders generically denoted 505 and 506, respectively.

For the sake of illustration, the video analysis can estimate a level of complexity of the scene represented by the video for future encoding, detect some regions of interest, and suggest the user some multi-stream encoding, for example one for background and one for ROI, and suggest partitioning into spatial areas. The video analysis can directly configure the video encoders 506. Alternatively, a user can keep the control on the video encoding configurations through step 531. Such a step makes it possible for the user to choose an encoding format, whether or not to use scalable format, or whether to choose multiple independent streams or a single video bit-stream.

The user can also decide to encode regions of interest and define different compression ratio for the region of interest and for the background. Multiple regions of interest can be encoded. The user can decide to encode one or more versions of the same content (full video, tile, ROI . . . ) to later provide some dynamic adaptation possibilities. A partitioning can be defined by the user during step 531 to enable clients to select and stream any tile region in the encoded video bit-stream.

The same applies to audio data and audio encoding.

The video analysis module can also generate video annotations that can be considered as metadata streams (textual data or structured data like XML or JSON) possibly timed metadata that can be time aligned with video and/or audio frames. If the user has additional resources on the recorded content, they can be also added as other metadata tracks providing information on the media presentation. The video analysis module can also get information and/or statistics from the media encoders 505 or 506 and store corresponding items of information as metadata tracks. For example, in the case of video bit-streams, quality items of information can be stored on a frame basis. When spatial partitioning is configured by the user, these items of information can be stored on tile basis.

When encoding is done, all the media streams plus metadata streams are encapsulated into one or more media files. Again, the user can configure the way the media content is encapsulated (step 532). For example, the video bit-streams can be encapsulated in one track or in separate tracks. According to particular embodiments, if the encoding format is HEVC or Layered HEVC with tiles, the user can encapsulate each tile in a tile track with a tile region descriptor and gather common information into a tile base track.

When independent streams are encoded, the user can encapsulate one video bit-stream in its own track. If these video bit-streams are actually spatial parts of another video, the user can annotate each video track with a tile region descriptor known as 'trif' (as defined in section 10 of ISO/IEC 14496-15 $4^{th}$ edition). Depending on the user settings or on the video analysis module, the user can control the granularity of the spatial parts encapsulated in a track.

When metadata track are present like video annotation 507 or some user description 508, these metadata track can be associated with the concerned video track through a track reference type 'cdsc'. This indicates that the metadata track contains descriptive information for the video track. An example of metadata track can be dynamic ROI information or quality metrics as defined in ISO/IEC 23001-10.

Next, after encapsulation step 509, the user can control the packaging of the data for adaptive streaming (step 533). This step can be performed, according to a particular embodiment, by an mp4 (ISO BMFF) writer. Other packaging or descriptive formats like MPEG CMAF, WebM, Matroska or MPEG-2 Transport Stream could also be used. During this step, the user can select an adaptive streaming format, for example DASH, HLS, or Smooth Streaming (making sure that the encapsulation format selected at step 532 is supported by the streaming protocol selected in step 533).

According to a particular embodiment, the user selects DASH thus leading to the generation of a MPD as manifest file and to the generation of initialization and media segments. The initialization segments contain data to setup the decoders of the client apparatuses while the media segments actually contain the media data. Depending on the encoding choices in step 531 or configuration (if fixed settings) of the media encoders 505 and 506, there can be several alternative versions of the same media component. A media component is one audio stream or one video stream or one metadata stream or any stream with a particular media type. A video stream can actually correspond to a full video or to partitions of a full video like a tile, a set of tile or corresponding to a region of interest.

It is to be noted that for live content, the user control steps 531, 532 and 533 may not be possible since introducing some delay. In such a scenario, the user configures a priori the different modules in charge of encoding (505, 506), of encapsulating (509), and of generating manifest and segments (510).

FIG. 5b illustrates an example of steps for processing media data by a client apparatus (for example client apparatus 320 in FIG. 3).

As illustrated, a first step is directed to accessing a streaming service (step 550), for example via a Web site where videos can be streamed or on streaming portal service. By accessing the service and selecting or clicking on a video, the client apparatus requests a streaming manifest (step 551). It is to be noted that in some cases, the client functions and the associated adaptation logic can be embedded as applicative Javascript code in the web page or in the streaming service the user is connecting to. In such a case, it is run by a Web browser that acts as the user interface and display. Alternatively, the streaming client can be a stand-alone application, implemented as a software module in the client apparatus and with its own adaptation logic(s).

After reception (step 552), the manifest is parsed (step 553) so as to build an in-memory representation or compiled MPD of the media presentation organization in terms of media resources and their alternative representations.

From the manifest, the client can determine whether compositions or preselections are declared in the manifest file (test 554). This can be done by looking for a <Preselection> element or descriptor or other descriptor indicating that resources may be aggregated before being provided to a parser (for de-encapsulation and generation of a media bit-stream) and to a media decoder. In the particular case of tiled videos, this can consist in checking whether there is a Representation or Adaptation Set corresponding to a tile base track and related Representations or Adaptation Sets describing tile tracks. Tile tracks can easily be identified through the codecs attribute (with value starting with 'hvt1') in the Representation, AdaptationSet, Preselection or Sub-Representation elements.

If compositions or preselections are declared in the manifest file and if the client apparatus can handle these compositions or preselections (test 555), the client apparatus is aware that a selection process is to be carried out for a dynamical adaptation to network conditions (for example bandwidth variations or delay variations). Next, the client apparatus inspects the manifest file (step 556) to look for additional description in the manifest providing some guidance on quality adaptation helping the client apparatus to determine a combination of data to request (as described hereafter).

If the manifest does not comprise such additional information, the client apparatus can decide whether or not it may support an advanced experience (i.e. combinations, compositions, or preselections of several media components with the same media type to be played simultaneously) described in the manifest (test 557).

If the client apparatus does not support such an advanced experience, it determines, through negotiation with the server apparatus (as described hereafter with reference to the "server control" embodiments), if it can rely on the server to handle a quality adaptation (test 558).

If the client apparatus can rely on the server to handle a quality adaptation, it requests the main media component of interest (step 559), for example the main resource in a preselection, only a ROI in a tiled video, a user view in 360° video, or only one media stream without associated additional resources like metadata streams, and it provides hints to the server apparatus to receive additional content (remaining content of the preselection or combination of composition of media components with the same media type).

If the client apparatus cannot rely on the server to handle a quality adaptation (test 558), the latter can inform the user apparatus that some features may not be available (step 560), for example some viewing modes for smooth quality over the whole composed video (for example a ROI plus surrounding tiles) can be disallowed. It can also remain silent (from user point of view) about non supported features and adapt the navigation menus and/or features offered to the user in the graphical interface. This can be done for example by not considering MPD elements declaring compositions, combinations or preselections in the in-memory representation of the MPD, or compiled MPD, built at step 553. In such a case, the client fallbacks to the basic DASH in which only one media component of a given media type is streamed at a time (step 561).

As illustrated, the same applies if the client apparatus cannot handle compositions or preselections (test 555).

If the client apparatus supports an advanced experience (test 557), it can play the combinations, preselections, or composition declared in the manifest. Accordingly, it activates and applies an advanced adaptation logic (step 562), during the streaming, described hereafter. Next, the client apparatus requests the different media segments corresponding to all the selected media components of the composition, preselection or combination. The appropriate version for each segment to download is computed by the advanced adaptation logic.

If the manifest comprises additional information providing some guidance on quality adaptation (test 556), also referred to as quality adaptation rules, for example an authorized quality degradation between adjacent video streams to be played as a single composite video, the client apparatus can rely on it for the selection of the appropriate media segments to request (steps 563 and 564).

At the end, the received media segments are given to the client's parser and further dispatched to appropriate media decoders for rendering to the user. Then the client iterates over the temporal segments of the media presentation reconsidering the selection of the media content component version depending on for example the available bandwidth, the filling rate of its media buffer, etc.

The client apparatus can keep the same requesting mode during the whole streaming session or can decide to change. A change in the requesting mode (step 561, 559, 562, or 563) can occur on client apparatus decision or on user input or depending on the server apparatus. One example is when a user changes his viewing mode, for example changing from a view of a region of interest within the full video to a view with the ROI only. This example would lead to switch back to a basic media stream requesting (step 561) if for example the ROI corresponds to one tile.

Likewise, a client apparatus can decide to apply its own advanced adaptation logic (step 562) despite the indication of quality rules (test 556 and steps 563 and 564). However, a client apparatus trying to determine a combination of data to be streamed may face adaptation issues (for example display freeze, buffer starvation or overflow or too computation intensive composed media streams to decode and/or display). In such a case, the client may decide to change its requesting mode for example from step 562 to step 563. Another example, depending on the server apparatus is the case where the client apparatus decides to rely on the server apparatus (step 559), for example using data pushing, and that server apparatus at some point decides to stop pushing. In such a case, the client apparatus may fallback to basic mode (step 561) or try by itself to adapt the selection of the multiple media components (step 562). Anyway, the annotations for quality rules adaptation that are added to the manifest are just suggestions from the content creator (or from an MPD editor aggregating media content) to the client apparatus. The latter can decide to use it or not (i.e. carrying out or not step 563).

It is also to be noted that some browsing modes may be provided to a user. For example, when a static ROI is determined at encoding time, the user may be informed that one ROI is present so as to choose between the ROI only, the ROI in the full video but with best quality or a crop of the full video around the ROI. Regarding the two last possibilities, a specific adaptation logic may be used to help the client to select a good set of tiles. The ROI can also be dynamic or user-selected as a preferred part of the video where to try to optimize the quality. If the selected area corresponds to multiple video components, some advanced adaptation is also required to guarantee a consistent quality on the whole image. As well, for applications to virtual reality or omnidirectional content, different qualities may be selected between the current point of view of the user and the surrounding areas. There is a good balance in the qualities for the current point of view and the surrounding areas so that when the user looks at another point in the virtual scene or to another area in the omnidirectional video, the quality does not fall too much (i.e. the quality disparity or the quality difference between the different areas should be controlled).

Applying Quality Rules

According to particular embodiments, some signaling is inserted for manifest generation (for example during step 533 of FIG. 5a). The content creator provides some quality adaptation rules that helps client apparatuses in selection of media content components, especially media content components with the same media type (several tiles for example). According to these embodiments, the content creator does not need to describe all the possible combinations which makes content preparation easier and media presentation description lighter. Moreover, it may be more adapted for live content packaging since a static quality rule can be defined once for all in the manifest and does not require computation of all possible combinations. These quality adaptation rules are intended to inform the client apparatus that in case of selection of multiple media content components of the same media type, there exist advantageous combinations planned by the content creator.

The use of such quality rules result in a better overall rendering quality of the composed media stream, for example a smooth quality between a ROI and its surrounding tiles.

It is to be noted that despite the presence of such quality rules, a client apparatus can decide to not follow these indications. Likewise, an old client not supporting this extension of the MPD ignores such items of information.

For the sake of illustration, these embodiments according to which quality adaptation rules are inserted in the streaming manifest are described in the DASH context, i.e. as extension of the MPD. In order to guarantee a consistent user experience across DASH clients, the content creator indicates some guidance on the selection of spatially related content, especially in terms of quality. To that end, the MPD provides signaling means to associate media content components with a same media type having a quality level that the content creator considers as equivalent. This information can be determined by a video analysis module (e.g. video analysis module 503 in FIG. 5a) or from video encoders (for example video encoders 506 in FIG. 5a), logs, or by encoding parameters defined by the content creator (for example during step 551 in FIG. 5b) or from subjective tests done by the content creator when encoding the media content.

Quality Equivalence Signaling or Cross Adaptation Set Quality Signaling

The quality level of a Representation can be defined by a "qualityRanking" attribute in the Representation element according to the MPEG DASH standard, being recalled that a Representation element typically describes a version of a media content component having a media type equal to video. The scope of the qualityRanking attribute is limited to one Adaptation Set to make it possible to order Representations according to a quality level inside an Adaptation Set.

Since the combination of portions of images or of tiles having different quality levels needs to rank Representations across Adaptation Sets, a solution consists in establishing links between quality levels of different Adaptation Sets based on the "qualityRanking" attribute. This can be done by using a new descriptor at Period level (or even at MPD element level if the quality ranks do not change from one Period to another). Such new descriptor can be expressed as follows:

<SupplementalProperty schemeIdUri="urn:mpeg:dash:quality_equivalence" value="1, 2"/> where the new @schemeIdUri value indicates that the attribute @qualityRanking provides a cross AdaptationSet qualityRanking and the "value" attribute provides the list of the AdaptationSets concerned by this @qualityRanking overloading.

For example, in the MPD snippet mentioned below, the new descriptor indicates that, for the given Period, Representation with id "1.1" and Representation with id "2.1" can be considered equivalent in terms of quality.

The MPD example below illustrates the quality equivalence descriptor.

```
<MPD...>
<Period> ...
<SupplementalProperty schemeIdUri="urn:mpeg:dash:quality_equivalence" value="1,
2"/>
<AdaptationSet contentType=« video » id="1" ...>
<Representation id=« 1.1 » bandwidth=« 1000 » qualityRanking=« 0 » ...> <!--/*best Quality*/-->
... </Representation>
<Representation id=« 1.2 » bandwidth=« 500 » qualityRanking=« 1 »...> <!-- /*mid Quality*/ -->
... </Representation>
<Representation id=« 1.3 » bandwidth=« 250 » qualityRanking=« 2 »...> <!-- /*low Quality*/ -->
... </Representation>
</AdaptationSet>
<AdaptationSet contentType=« video » id=2 ...>
<Representation id=« 2.1 » bandwidth=« 1000 » qualityRanking=« 0 »...> <!-- /*best Quality*/ -->
... </Representation>
<Representation id=« 2.2 » bandwidth=« 800 » qualityRanking=« 1 » ...> <!--/*mid Quality*/ -->
... </Representation>
<Representation id=« 2.3 » bandwidth=« 500 » qualityRanking=« 2 » ...> <!--/*low Quality*/ -->
... </Representation>
<Representation id=« 2.4 » bandwidth=« 250 » qualityRanking=« 3 » ...> <!--/*low Quality*/ -->
... </Representation>
</AdaptationSet>
... </Period>
</MPD>
```

Other alternatives for this quality equivalence are described further in the description. This first new descriptor for quality equivalence is a first part of the solution. Another information is required to produce composed video with acceptable overall quality: an indication of what is authorized in terms of quality degradation. We generally call this indication the "quality rule" descriptor.

Quality Adaptation Rule (or Quality Rule) Indication

Once similarities in terms of quality have been determined between Representations of different AdaptationSets, a quality rule for choosing or selecting Representations should be added within the manifest, that is to say to indicate what is authorized in terms of quality degradation.

Such a quality rule helps a client apparatus in selecting a good set of tiles to preserve overall quality of the reconstructed video. It is an indication from the content creator of quality degradation pattern.

For example, the content creator may indicate that there should be no more than 1 level of quality difference (in quality ranking unit) between the one or more tiles corresponding to the ROI and its surrounding tiles. In other words, the content creator authorizes a maximum quality disparity of one level of quality. To express this, the following descriptor can be used: <SupplementalProperty schemeIdUri="urn:mpeg:dash:max_quality_degradation "value="1"/>

This descriptor, as for the previous one, can be placed at MPD element level or at Period element level. The value of the @schemeIdUri attribute indicates a suggested maximum quality degradation between one tile and its neighbor tiles, or more generally between one media component and another media component to be displayed together. The attribute @value indicates that when playing a set of Representations of the same media type from different Adaptation Sets, the client should not select adjacent Representations having a difference in quality ranking greater than 1.

For the sake of illustration, such an adaptation scheme may result in the following scenario: first, the client apparatus tries to select all spatial parts forming the composed video at the highest quality; if the required bit rate corresponding to this selection is too high for the available bandwidth, then it switches to lower quality level for all tiles except the ones corresponding to a region of interest; if it remains too high in terms of bitrate, then it switches to a lower quality level for the tiles corresponding to the ROI and also for the surrounding tiles. Without the use of such a quality rule, the client apparatus could have selected the Representation at the highest quality for the ROI and at the lowest quality for surrounding tiles, which would have led to jumps in quality around the ROI borders and produced a poor user experience.

The descriptor used for signaling the quality rules may also be used to provide quality equivalence that can have more descriptive capabilities by adding parameters, attributes, or element. For example, it could explicitly list equivalent Representations as a list of Representation id values, such as:
<SupplementalProperty schemeIdUri="urn:mpeg:dash: quality_equivalence" "value="1.1, 2.1; 1.2, 2.2"/>.

The use of such a descriptor does not require anymore the attribute qualityRanking to be defined.

Then, the previous example (shortened) rewrites as the example below:

```
<MPD...>
<Period> ...
<SupplementalProperty schemeIdUri="urn:mpeg:dash:quality_equivalence" value="1.1,
1.2; 2.1, 2.2" />
<AdaptationSet contentType=« video » id=1 ...>
<Representation id=« 1.1 » bandwidth=« 1000 » ...> <!--/* a first quality level*/--> ...
</Representation>
<Representation id=« 1.2 » bandwidth=« 500 » ...> <!--/* a second quality */ --> ...
</Representation> ...
</AdaptationSet>
<AdaptationSet contentType=« video » id=2 ...>
<Representation id=« 2.1 » bandwidth=« 1000 » ...> <!--/* the first quality */ --> ...
```

-continued

```
</Representation>
<Representation id=« 2.2 » bandwidth=« 800 » ...> <!--/* the second quality */ --> ...
</Representation>...
</AdaptationSet>
... </Period>
</MPD>
```

It is to be noted that according to this example, the content creator guarantees that the Representation with "1.1" and "1.2" are of equivalent quality, even if the corresponding bandwidths are not equal. Similarly, Representations with equal bandwidth requirements would not automatically mean that they are equivalent in terms of quality. The equivalence has to be deduced from the quality equivalence descriptor when present.

Moreover, it is a direct association between Representations of selectable media content components, whatever the criterion used by the content creator for the quality equivalence (bandwidth, resolution, associated metadata, etc.).

An example of using this quality equivalence descriptor is directed to the case according to which a streaming manifest contains a scalable stream like for example a video bit-stream encoded with SVC or SHVC. If the same manifest contains alternatives to the scalable stream where each layer is encoded as a video bit-stream, for example in AVC or HEVC, then the quality equivalence descriptor can be used to indicate the equivalence between an independent bit-stream with one or more layers of the scalable stream.

The example of MPD given below provides an example for two independent bit-streams (described by Representation "1.1" and "1.2") encoded in HEVC for which a quality equivalence is given to the scalable layers of a scalable HEVC bit-stream (SHVC) represented by a base layer (Representation with id "2.1") and an enhancement layer (Representation "2.2" that depends on Representation "2.1"). The type of scalability here is a spatial scalability, but this could apply to other types of scalability, especially Multiview HEVC. The codec attribute of each Representation indicates the encoding format.

```
<MPD....>
<Period> ...
<SupplementalProperty schemeIdUri="urn:mpeg:dash:quality_equivalence " value="1.1,
2.1; 1.2, 2. 2"/>
<AdaptationSet contentType=« video » id=1 ...>
<Representation id=« 1.1 » codec="hvc1..." bandwidth=« 1000 » width=1920 ...> ...
</Representation>
<Representation id=« 1.2 » codec="hvc1..." bandwidth=«2500 » width="3840"...> ...
</Representation>
</AdaptationSet>
<AdaptationSet contentType=« video » id=2 ...>
<Representation id=« 2.1 » codec="hvc1..." bandwidth=« 1000 » width="1920"...> ...
</Representation>
<Representation id=« 2.2 » codec="hvc2..." dependencyId="2.1" bandwidth=« 1200 »...
</Representation>
</AdaptationSet>
... </Period>
</MPD>
```

An alternative embodiment for the quality equivalence descriptor is to define, as a new attribute in the definition of a Representation, an element that indicates which Representation can be combined with other Representations in the MPD with equivalent quality. The value of this attribute can be for example an unsigned integer or a string. Each value of this attribute has to be unique for a given Period. The example below provides an example of such descriptor for a cross Adaptation Set quality ranking information:

```
<AdaptationSet id="1" ...>
<Representation id="Rep1" bandwidth ="500000" ... preselect="HQ"...>
...
</Representation>
<Representation id="Rep2" bandwidth ="250000" ... preselect="MQ"...>
...
</Representation>
<Representation id="Rep3" bandwidth ="175000" ... preselect="LQ"...>
...
</Representation>
</AdaptationSet>
<AdaptationSet id="2" ...>
<Representation id="Rep4" bandwidth ="540000" ... preselect="HQ"...>
...
</Representation>
<Representation id="Rep5" bandwidth ="280000" ... preselect="MQ"...>
...
</Representation>
<Representation id="Rep6" bandwidth ="195000" ... preselect="LQ"...>
...
</Representation>
</AdaptationSet>
```

According to this embodiment, a client apparatus can immediately identify three levels of preselection that are "HQ", "MO", and "LQ". The value taken by this new attribute can be of type string (xs:string when expressed in XML Schema). The use of this attribute is really simple since all the Representations sharing the same value in their "preselect" attribute are considered by the content author as being equivalent in terms of quality.

As such, assembling two media streams, for example one image on the left of the display screen and another image on the right of the same display screen, from two or more representations having the same value for preselect attribute results in homogeneous quality between these two images.

This signaling makes it straightforward to find Representations that can be combined with each other without introducing quality disparity: the client apparatus selects a set of Representations having the same value in their "preselect" attribute.

There exist alternatives for dynamic adaptation and control of the quality disparity.

According to a first alternative, the values of the preselect attribute are limited to unsigned integers (xs:unsigned Int in XML schema). By doing so, the client apparatus can determine that when it has an authorized quality degradation set to 2 levels of quality (either via a specific signaling in the manifest, via a configuration of the client apparatus, or via a dynamical definition from the user through his/her graphical interface) it can select one first Representation with preselect attribute value set to "N" and combine it with other Representations having their preselect attribute set to no less than the value "N−2". By default, when no combination, composition, or preselection information is indicated in the manifest, all Representations with a preselect attribute can be combined.

A second alternative for dynamic adaptation and control of the quality disparity mainly consists in defining another attribute in the Representation element, for example an attribute having the "max_quality_disparity" name (being observed that another name can be used provided it is declared in the XML schema of the MPD). This attribute can be declared as being of type integer, its value indicating the maximum quality disparity or difference between selected media components to be composed and rendered simultaneously.

The above example then rewrites as follows:

```
<AdaptationSet id="1" ...>
<Representation id="Rep1" bandwidth ="500000" ... preselect="HQ" max_quality_disparity="2">
...
</Representation>
<Representation id="Rep2" bandwidth ="250000" ... preselect="MQ" max_quality_disparity="2">
...
</Representation>
<Representation id="Rep3" bandwidth ="175000" ... preselect="LQ" max_quality_disparity="2">
...
</Representation>
</AdaptationSet>
<AdaptationSet id="2" ...>
<Representation id="Rep4" bandwidth ="540000" ... preselect="HQ" max_quality_disparity="2">
...
</Representation>
<Representation id="Rep5" bandwidth ="280000" ... preselect="MQ" max_quality_disparity="2">
...
</Representation>
<Representation id="Rep6" bandwidth ="195000" ... preselect="LQ" max_quality_disparity="2">
...
</Representation>
</AdaptationSet>
```

When the max_quality_disparity="2" is present in a manifest where there is already a descriptor to describe the maximum quality degradation, for example at top level of the MPD, <Period> element or <MPD> element, then this max_quality disparity preferably redefines the value of the top level descriptor. Alternatively to an attribute value, the max_quality_disparity parameter can be placed in a DASH descriptor element of a Representation element like SupplementalProperty for example or in a dedicated element for quality rule indication. This applies as well when the Representation contains SubRepresentation elements. The max_quality_disparity parameter indicates that the content author recommends to avoid combining a Representation or a SubRepresentation with another Representation or a Sub-Representation having a quality level two steps below the one containing this max_quality_disparity parameter.

The example values for the attribute proposed above can also be a signed integer so that the value "0" can indicate for example the default version to start with and positive value would indicate higher quality and lower values would indicate lower quality. A main difference with the qualityRanking attribute is that it is an absolute quality indication for a given Period element while the qualityRanking attribute applies only in one Adaptation Set.

To specify, based on this embodiment, which sets of Representations can be combined together there exist multiple alternatives.

A first alternative consists in defining the new attribute used to determine the Representations with equivalent quality (that may be called @preselect for example) as a pair of values containing two identifiers: a first identifier used for providing a unique identifier for a composition, combination or preselection and a second identifier as previously described, i.e. for providing an absolute quality value across Adaptation Sets.

The first identifier can be seen as conceptually similar to the "source_id" parameter in the DASH SRD descriptor. It is to be noted that with the introduction of this first identifier, the scope of the absolute quality can be reduced to Representations whose @preselect attribute carries the same value for this first identifier. This identifier can be a string or an integer or any type, provided it is easy and fast to compare whether one value differs from another.

The previous example rewrites as follows:

```
... <AdaptationSet id="1" ...>
<Representation id="Rep1" bandwidth ="500000" ... preselect="C1, HQ" max_quality_disparity="2">
...
</Representation>
<Representation id="Rep2" bandwidth ="250000" ... preselect="C1, MQ" max_quality_disparity="2">
...
</Representation>
<Representation id="Rep3" bandwidth ="175000" ... preselect="C1, LQ" max_quality_disparity="2">
...
</Representation>
</AdaptationSet>
<AdaptationSet id="2" ...>
<Representation id="Rep4" bandwidth ="540000" ... preselect="C1, HQ" max_quality_disparity="2">
...
</Representation>
<Representation id="Rep5" bandwidth ="280000" ... preselect="C1, MQ" max_quality_disparity="2">
...
</Representation>
<Representation id="Rep6" bandwidth ="195000" ... preselect="C1, LQ" max_quality_disparity="2">
...
</Representation>
</AdaptationSet>...
```

In the above example, there is only one composition, combination or preselection defined with identifier "C1". The different quality levels are identified as "HQ", "MQ", or "LQ".

The example below illustrates the use of the same attribute with only two quality levels "HQ" and "LQ" but two compositions, combinations or preselections denoted "C1" and "C2". For the sake of clarity, the possible combination with the "max_quality_disparity" attribute is not shown in this example, but could apply as well.

```
<MPD> ...
<AdaptationSet id="1" ...>
<Representation id="Rep1" bandwidth ="500000" ... preselect="C1, HQ" >
...
</Representation>
<Representation id="Rep2" bandwidth ="175000" ... preselect="C1, LQ" >
...
</Representation>
</AdaptationSet>
<AdaptationSet id="2" ...>
<Representation id="Rep3" bandwidth ="540000" ... preselect="C2, HQ" >
...
</Representation>
<Representation id="Rep4" bandwidth ="195000" ... preselect="C2,LQ" >
...
</Representation>
</AdaptationSet>
<AdaptationSet id="3" ...>
<Representation id="Rep5" bandwidth ="540000" ... preselect="C1, HQ" >
...
</Representation>
<Representation id="Rep6" bandwidth ="195000" ... preselect="C1,LQ" >
...
</Representation>
</AdaptationSet>
<AdaptationSet id="3" ...>
<Representation id="Rep7" bandwidth ="640000" ... preselect="C2, HQ" >
...
</Representation>
<Representation id="Rep8" bandwidth ="235000" ... preselect="C2,LQ" >
...
</Representation>
</AdaptationSet>
...
</MPD>
```

According to this example, a client apparatus can easily deduce from MPD parsing that Representation with id="1" may be combined without quality difference with Representation having id="5". Likewise, Representations with id="3" and id="7" may be combined. These two combinations have as lower quality the combinations: Representations with id="2" and id="6" and Representations with id="4" and id="8".

The quality rule and quality equivalence discussed in this embodiment can also be combined with the <Preselection> element defined in DASH as discussed according to the embodiments referred to as "content creator".

This new attribute for quality equivalence avoids changing the semantics of the existing qualityRanking attribute and may avoid backward compatibility issues.

The quality equivalence and the quality rule descriptors apply to content components that are signaled to be composed or combined together. This requires a content component selection descriptor to let the client know what it is offered by the content creator. This content component selection descriptor is discussed and described below with the embodiment for "content creator".

There are different alternatives for the signaling of the quality adaptation rule pattern, more generally called the quality rule descriptor.

According to particular embodiments, it is described at the <MPD> or <Period> level depending on whether the adaptation rule is fixed for the whole presentation or can vary from one Period element to another, typically when the media presentation is interrupted by adverts in some periods, it may be useful to deactivate the quality adaptation rule during these periods (unless the adverts also imply composition or combination of multiple media content components). There are cases where this quality adaptation rule can be declared at lower levels than the Period element. This can be the case for presentation of video streams having tiles encapsulated into tile tracks, each encapsulated in a Representation.

The quality rule, when specifying a maximum authorized degradation level can be split in two dimensions: specifying a first value in horizontal dimension and another one in vertical dimension. For example: <SupplementalProperty schemeIdUri="urn:mpeg:dash:max_quality_degradation value="1, 2"/> or with explicit attribute names: <SupplementalProperty schemeIdUri="urn:mpeg:dash:max_quality_degradation value_h="1" value_v="2"/> to indicate a maximum authorized quality difference of one level in horizontal neighborhood and a quality difference up to 2 quality levels in vertical dimension.

According to particular embodiments, the descriptors used for signaling quality rules such as a maximum quality difference between a ROI and other parts may also comprise optional indications to indicate a "filter-like" quality reduction ratio and/or a specific place in the video to apply the quality reduction (by default centered on the ROI). For example:
<SupplementalProperty schemeIdUri="urn:mpeg:dash: quality_rule_filter "value="3, 3, 2, 1, 2, 1, 0, 1, 2, 1, 2"/> indicates a 3×3 pattern with different authorized quality degradation values around a spatial part of a video located on the value 0 (center of the filter). The "filter-like" quality reduction can also be split in two filters, one per dimensions, for example:
<SupplementalProperty schemeIdUri="urn:mpeg:dash: quality_rule_filter 2D "value="(3, 1, 0, 1); (3, 1, 0, 1)"/> to specify a 1×3 pattern with different authorized quality degradation values around a spatial part of a video located on the value 0 for each horizontal and vertical dimension.

The above example assigns the same values in both directions but there are cases where having different patterns according to the direction is useful. This can be advantageous for application like in 360° streaming where user mainly moves the head along one direction: client may put more quality on the regions potentially seen by the user (i.e. left and/or right view of the current one instead of top and bottom ones). The quality rule can even be dynamically computed by the client depending on the head motion: when moving to the right, the quality will be preserved for the right parts of the video as most as possible and more degradation is allowed in other directions (left, top and bottom). Ideally, the filter follows the tiling or a composition grid of spatial parts like depicted on FIGS. 1a or 1b, so that a quality adaptation weight is specified per component of the preselection.

It may also indicate other parameters such as a maxDeltaQuality, a maxHorizDeltaQuality, a maxVertDeltaQuality, or a maxDiagDeltaQuality attribute, an indication to create or not a single bit-stream, an indication related to tiled or not tile media data. Another quality rule can consist in listing some content components of a preselection as to be frozen during one or more segments when conditions become severe (network congestion, high delay . . . ). The quality rule can also combine with the SRD descriptor by defining a list of parameter like a source_id to refer to a tile, or to a region in 360° video or virtual reality content, and a maximum quality degradation allowed for the related tile or region: like value="<SRD_source_id>, NULL, <maxQualityDegradation>", or value="<SRD_source_id>, NULL, <maxHQualityDegradation> <maxVQualityDegradation>" to specify one quality degradation per direction or value="<SRD_source_id>, NULL, <maxHQualityDegradation> <maxVQualityDegradation> <maxDiagQualityDegradation>" for tiles weighting according to a Manhattan distance. The quality rules may also be indicated in metadata tracks using specific @associationType values. For example a specific association Type value is defined and registered as a four character code (for example: 'qinf' for quality information) to indicate that a metadata stream contains metadata for quality adaptation of the associated Representation or timed samples for quality information on the associated Representation. When a metadata stream contains the quality rules, then the quality rule descriptor can directly reflect this, for example:

<SupplementalProperty schemeIdUri="urn:mpeg:dash:quality_rule_external "value=" (ID of the metadata stream)"/>

According to these embodiments, the streaming client knows that there is a degradation quality pattern indicated by the content creator (the result of test 556 in FIG. 5*b* is true). It can take it into consideration when requesting the media data. This should be helpful for a consistent experience across client apparatuses.

Other embodiments consist, for the user creator, to be more explicit than a quality adaptation pattern, by describing in the manifest all the possible combinations so that a client apparatus does not need any change in its adaptation logic, just to support the signaling for these combinations.

Content Creator

According to the previous embodiment, the content creator provided a rule for quality adaptation (the quality rule descriptor) and avoided the exhaustive declaration of all possible combination alternatives.

In these embodiments, the content creator makes implicit the quality rule by providing an exhaustive description of the possible combinations of media content components (for example at step 533 of FIG. 5*a* or when configuring encoders, transcoders, or packagers, respectively in steps 531 and 532).

To do this, the content creator relies on a content component selection element and/or on a content component descriptor. The content component selection element enables the content creator to express combinations of media content components with the same media type that guarantee, when played together that the resulting quality of the composed video does not suffer from strong quality variations at the borders of images parts or tiles that are composed together.

The content component selection element can be an extension of the <Preselection> element that exists in DASH MPD (since the 4th Amendment as defined in w16221, June 2016). The content component selection descriptor can also be a specific kind of Adaptation Set with a specific attribute or descriptor to indicate that this Adaptation Set is a composition, combination, or bundle of classical Adaptation Sets declared in the same MPD or, for example through an Xlink element of Adaptation Sets that are declared in other MPDs). One example of annotation is a new attribute, whatever its name, to indicate that the Adaptation Set is a "virtual" Adaptation Set:

```
AdaptationSet virtual="true" .... >
    or a "referencing" AdaptationSet declared through a DASH descriptor:
<AdaptationSet ....>
<EssentialProperty scheme_id_uri="urn:mpeg:dash:2017:component-selection" value="1, 2"/>
...
</AdaptationSet>
```

In the example above, the Adaptation Set for content component selection references other Adaptation Sets with id="1" and id="2". This means that when using as content component selection an Adaptation Set, the referenced Adaptation Set should declare an "id" attribute. A content component selection element does not declare any segment url but rather references other Adaptation Sets. The component selection element (the extended Preselection element or the specific Adaptation Set) can contain Representation elements to declare alternative versions of a composition or combination or bundle, but these Representations only reference other Representations from the referenced Adaptation Sets by the content component selection element.

In the case where the Preselection element or the descriptor is used as content component selection element, an indication of the expected combinations of listed media components can be useful. Indeed, it has been noted that the existing Preselection feature definition is not clear when both features Main AdaptationSet and Partial AdaptationSet are introduced.

In particular, it is not clear if all the preselectionComponents shall be played together, or if only main or main plus a subset of partial AdaptationSets are also allowed.

According to another embodiment of the invention, it is proposed to include, in the content component selection element, an additional parameter describing the expected use of the content author, in terms of media component combination. For example, this new parameter (the name "selectionType" below is an example) is provided as an additional attribute in the Preselection element:

```
<Preselection id="P1" selectionType="all" preselectionComponents="(list of components)" ...>
... </Preselection>
<Preselection id="P2" selectionType="any" preselectionComponents="(list of components)"
...> ... </Preselection>
<Preselection id="P2" selectionType="main" preselectionComponents="(list of components)"
...> ... </Preselection>
```
This new parameter can also be declared in a Preselection descriptor:
```
<SupplementalProperty       schemeIdUri="  urn:mpeg:dash:preselection:2016"  selectionType
="all" value=" (list of components)".../>
    <SupplementalProperty       schemeIdUri="      urn:mpeg:dash:preselection:2016"
selectionType ="main" value=" (list of components)".../>
    <SupplementalProperty       schemeIdUri="      urn:mpeg:dash:preselection:2016"
selectionType ="any" value=" (list of components)".../>
```

It is to be noted that this additional parameter for intended or expected combinations of the media components inside a Preselection or more generally in a content component selection element applies to Preselection, whatever its declaration: SupplementalProperty, EssentialProperty or specific element inheriting from the DescriptorType defined in the MPD schema. It can be implemented as any node (element or attribute for example) under the Preselection element or descriptor. In the case of the Preselection descriptor, it can also be one of the parameters listed in the "value" attribute.

Figure 8:
FIG. 8 is a table providing combinations of media components according to an embodiment of the invention.

The semantics of this new parameter is defined as follows:

when the parameter has the value "any", it means that any combination of the media components in the content component selection element (for example a Preselection element or descriptor) can be selected for download and rendering, even without the media component corresponding to the main AdaptationSet;

when the parameter takes the value "main", it means that any combination of the media components in the content component selection element (for example a Preselection element or descriptor) can be selected for download and rendering, provided that the media component corresponding to the main AdaptationSet is selected;

the last possible value is "all"—it means that only the listed combination can be played, i.e. one alternative encoded version for each media component declared in the content component selection element—for example, in a Preselection element, it is the list declared in the attribute "preselectionComponents"— for the Preselection descriptor, it would be the list of identifiers provided in the attribute "value"—the table 800 in FIG. 8 provides, for each combination between the Main AdaptationSet and the Partial AdaptationSets, the possible values for this parameter;

another possible value is "recommended" or "best" or "fallback" with a list of identifiers providing the list of components inside the Preselection that provides an interesting combination between only the main AdaptationSet and the whole Preselection—this "recommended" or "best" selection can be seen as fallback operating point when some adaptation in terms of streaming or processing of the content at receiver side requires adaptation—in such case, it might not be possible to download and render the whole Preselection a fallback to only the main adaptation set may provide poor user experience while switching back to a subset of components declared in the Preselection.

An alternative embodiment for the selectionType attribute is to use it in order to explicitly indicate which content component corresponds to the main media component (i.e. AdaptationSet or ContentComponent). For example, the declaration below:

<Preselection id="P1" preselectionComponents="3 1 2 4" selectionType="main 3"> is an indication by the content author that the media component having an @id value equal to 3 should be played whatever the combination among the partial AdaptationSets in the list of identifiers: 1, 2 or 4.

This enables a client apparatus to keep on using adaptation logic as if one media content component was selected at a given time. Indeed, each Representation element declared in the content component selection element declares attributes that correspond to the maximum values of the referenced Representations, for example for width and height or to the sum of the referenced Representations, for example for bandwidth element. Each Representation of the content component selection element actually references Representations that are known by the content creator to be equivalent in terms of quality (i.e when displayed together no quality difference is noticeable by the user between each of the content component, for example between an ROI and its surrounding tiles.)

To reference other Representations for compositions or combinations, the content creator can use the dependencyId attribute, especially for the main content component (the one to play by default when a client cannot support the whole combination). For the other referenced Representations, the content creator can declare those through an associationId with, for the associationType attribute, an "aggregate" value or any reserved or registered value to indicate the associatedRepresentation, as defined by DASH, contains the Representation with the id whose value is present in the associationId attribute as one component of the media composition, media experience, or bundle.

The content component selection element can be seen as an entry point in the manifest, i.e. a set of media components selectable for streaming and rendering. The declaration of one media component inside a content component selection element can lead to make no more selectable this media component. In such case, this media component is not intended to be selected and rendered alone. This means that it is present in the streaming manifest only because some selectable media components depend on it or because it is referenced in a Preselection or any content component selection element.

In an embodiment of the invention, it is proposed to explicitly distinguish the media components that can be selected and rendered alone from the media components that are just described because used in the computation of other components or referenced in a bundle, preselection or content component selection. This allows streaming media players to filter easily the media components to expose to a user or to an application in charge of content selection. This distinction is done with an additional parameter associated to media components, for example as an attribute in AdaptationSet, ContentComponent, Representation or Sub-Representation. As an example, this attribute can be called "playbackType".

It can be used for example with tile tracks. When the AdaptationSets describing the tile tracks are part of a content component selection (for example a Preselection), they can have this "playbackType" attribute set to "disable" to indicate that the tile tracks are not selectable to be played alone. The content component selection (e.g. the Preselection) in this case provides a selectable part of the media presentation (that can be called an entry point). Having all tracks exposed as Representation in AdaptationSet referenced in Preselection and described as not selected for display (@playback_type="disable") allows ambiguities to be avoided when the manifest contains AdaptationSet describing tracks with the same codec type.

For example this allows an hvc2 or hev2 tile base track to be differentiated from an hvc2 or hev2 composite track or classical HEVC track that themselves may be declared as playbackType="always" (which is the default value.):

```
<AdaptationSet id="10" playbackType="disable" ... > ...
</AdaptationSet>
<Preselection preselectionComponents="... 10 ..." id="P1"/>.
```

A media component that is an entry point (meaning a first media component to be parsed by a client) in the manifest can be marked with the value "always" in this "playbackType" attribute. This "always" value is the default value for "playbackType"; i.e. when absent, the media component is assumed to be selectable and rendered alone. "alone" means the corresponding current Representations plus the Representations this current Representation depends on. The name and possible values for this new parameter are indicative and provided as examples. Another possible value is "preview" to indicate that a media component can be when a user or an application needs a preview of a movie, or few seconds of an audio clip or whatever short presentation of a media element. The examples provided here are not exhaustive. An Adaptation Set marked with this attribute should not be considered as interactively selectable/an entry point in the presentation by the DASH clients.

When the media content components are described by a SubRepresentation, the SubRepresentation also becomes a content component selection element and the list of components for this SubRepresentation references components from other SubRepresentations contained in the Representations referenced by the parent Representation of this SubRepresentation.

The quality equivalence descriptor and the quality adaptation rule descriptor, in these embodiments, may be implicit since the syntax element (Preselection, AdaptationSet, or Representation) that contains the component selection descriptor provides an ordered list of alternatives. In addition to the above descriptors, the media presentation description can also contain other informative descriptors: a composition purpose (or "combination purpose" or "preselection purpose" or "bundle purpose") descriptor and a decoder requirement descriptor. The composition purpose descriptor is a descriptor associated with the content component selection descriptor. It can be an attribute of the content component selection descriptor or an EssentialProperty or SupplementalProperty element as a child of the content component selection descriptor. The MPD snippet below illustrates the use of such a descriptor when the content component selection descriptor uses a Preselection element:

```
...<Preselection ... purpose="HEVC tiling">
</Preselection>....
```

The purpose description can provide additional information on the intended combination, for example to describe the different combinations according to FIG. 1b. For example, when the composition implies independent videos, when a clipping is done on a subset of extracted tiles without stream modification, when several independent videos are assembled into a single video bit-stream. In case there is only one composition or preselection, the purpose descriptor and the decoder requirement descriptor can be declared at the MPD element level (if static) or at the Period element level if changing along time.

The objective of this "composition purpose" is to inform a client apparatus on the kind of composition, combination or preselection the content author prepared for streaming. This can be used by a client apparatus to tune the user interface and propose or activate or deactivate some navigation menus. For example, with the "HEVC tiling" purpose illustrated above, a client apparatus could display to the user a grid of tiles so that the user can easily select a set of tiles to play simultaneously. Other values are possible like "ROI plus surrounding tiles" or "360° main view plus other views". The value of this "combination purpose" or "composition purpose" can be of the string type. It can also be a value taken from a list of pre-defined values in a registry. The latter option facilitates a further interpretation from client apparatuses. It is to be noted that a Label element can also be used to express the "combination purpose" in the streaming manifest.

Another optional descriptor is the "decoder requirement" descriptor. Indeed, when a content creator provides advanced combinations, it may be required for the client apparatus to use simultaneously multiple decoders. Thus, the decoder requirement descriptor can be used in the MPD, under the content component selection descriptor. As for the previous one, it can be a specific attribute or parameter in the content component selection descriptor or a DASH descriptor with its on scheme_id_uri. For example:

```
<Preselection ...> ...
<EssentialProperty scheme_id_uri="urn:mpeg:decoder-reqs"
value="single"/>
...
</Preselection>
```

In case, the composition, combination or preselection requires more than one instance of decoder of a given media type (e.g. video decoder 343 in FIG. 3 or audio decoder), the value of this descriptor can be set to "multiple". It can also be used to indicate post-processing operation immediately following the decoding step to be performed by client apparatuses that implement some post-filtering (for example value="post-filter"). Values can be combined (for example value="post-filter&single" to indicate a single decoder is required with a post-processing step). The decoder requirement descriptor can also be used to recommend post-filtering operation at client side when for example a deblocking filter is available. The post filtering operation may be signaled in post-decoder information contained in the ISO BMFF file, or even provided by a metadata stream. It is associated to the content component selection element.

In the case where the Preselection element is defined as a set of media components to be provided to a single decoder instance, an indication on initialization segments can be useful for clients. Indeed, a Preselection defines a "main" AdaptationSet as the one providing the decoder specific information. This means that the main AdaptationSet contains an Initialization Segment (in the DASH terminology). In the prior art, it is not clear whether the Partial AdaptationSet(s) use this initialization segment or can have their own initialization segment. This information is useful for media players to correctly set up their decoders. For example, if a Preselection declares a set of video tracks with 'hvt1' tile tracks with a tile base track as main AdaptationSet, only one initialization segment is declared (the one of the tile base track). At the reverse, when considering a Preselection for 3D audio, with multi-stream audio, there may be several initialization segments, for example one for each stream. These may be handled by an audio spatializer for example that provides each audio stream to one or more audio decoders. For tiling and single video instance, the ISOBMFF parser and the video decoder are in charge of respectively forming a compliant video bitstream (for example compliant to one or more profile, tier, level of HEVC) and to decode this bitstream.

It could also be the case for tile tracks using 'hvc1' tracks (instead of 'hvt1') where each tile corresponds to an independent HEVC bitstream. In an embodiment of the invention, it is proposed in a specific signaling to allow the client to rapidly identify (when parsing the manifest), depending on the decoder specific information whether there exist restrictions in the combinations of the media components listed in a content component selection element (for example in Preselection element or descriptor). This signaling can be a new attribute, for example taking a Boolean value and called "singleInit". This attribute can be present in Preselection element or in Preselection descriptor as shown below:

The two lines below illustrate Preselection element with the additional parameter providing information on the number of initialization segments present in the Preselection:

It is to be noted that in a definition of Preselection descriptor in DASH 3rd edition, (w16221, June 2016), the value of the Descriptor provides two fields, separated by a comma: the tag of the Preselection and the id of the contained content components of this Preselection list as white space separated list in processing order. The first id defines the main media component. The previous example also works with such semantics for the value attribute. It is to be noted that this "singleInit" additional parameter applies to Preselection, whatever its declaration: SupplementalProperty, EssentialProperty or specific element inheriting from the DescriptorType defined in the MPD schema.

When set to true, this new attribute indicates that only media components of the Preselection sharing the same Initialization Segment may be combined. This introduces restrictions in the combinations of media components declared inside the Preselection. The client then knows that in one request, it can get the whole information to set-up its decoder(s). When set to false, this new attribute indicates that there may be one or more initialization segments but that the possible combination of media components declared inside the Preselection are given by the "selectionType" parameter. When not present, the default value applying to the Preselection is "false". This preserves backward compatibility with clients not interpreting this new parameter.

For example, when used for tiled videos at different resolutions, as the example in Tables 1 a and 1 b, there may be one Initialization Segment per resolution. Then, only the tiles at the same resolution may be combined to provide seamless switching. This means that switching into another resolution may require reinitializing the decoder(s) with the initialization segment corresponding to the other resolution. It is to be noted that since DASH MPD relies on XML schema, any node (element or attribute for example) under the Preselection element or Preselection descriptor can be used to convey this single initialization information. Moreover, it may be useful in any MPD syntax element describing multiple media components.

The Table 1 a illustrates an example of one Preselection (as an element) with singleInit="true" gathering two tile tracks at two different resolution levels.

The Table 1b illustrates an example of the same set of two tile tracks at two different resolution levels, each in a Preselection (not all syntax elements are present for readability).

```
<Preselection id="P1" singleInit="true" preselectionComponents="(list of components)" ...> ...
</Preselection>
<Preselection id="P2" singleInit="false" preselectionComponents="(list of components)" ...> ...
</Preselection>
```

The example lines below illustrate Preselection descriptor (here as a SupplementalProperty) with the additional parameter providing information on the number of initialization segments present in the Preselection:

```
<SupplementalProperty  schemeIdUri=" urn:mpeg:dash:preselection:2016" singleInit="true"
value=" (list of components)".../>
<SupplementalProperty  schemeIdUri=" urn:mpeg:dash:preselection:2016" singleInit="false"
value=" (list of components)".../>
```

TABLE 1a

```
<MPD ....>
    <Period...>
        <AdaptationSet id="10" ...>
            <Representation id="101" codecs='hvc2..." width="1920" height="1080" ...
>...</Representation>
            <Representation id="102" codecs='hvc2..." width="960" height="540" ...
>...</Representation>
        </AdaptationSet >
        <AdaptationSet id="11" bitstreamSwitching = "false" ...>
            <Representation id="111" dependencyId="101" codecs='hvt1..."
    width="1920" height="1080" ... >...</Representation>
            <Representation id="112" dependencyId="102" codecs='hvt1..."
width="960" height="540" ... >...</Representation>
        </AdaptationSet >
        <AdaptationSet id="12" bitstreamSwitching = "false" ...>
            <Representation id="121" dependencyId="101" codecs='hvt1..."
    width="1920" height="1080" ... >...</Representation>
            <Representation id="122" dependencyId="102" codecs='hvt1..."
width="960" height="540" ... >...</Representation>
        </AdaptationSet >
        <Preselection id="P1" preselectionComponents="10 11 12" singleInit="true" />
    </Period>
</MPD>
```

The MPD example in Table 1a describes an extended Preselection element with the "singleInit" parameter. The Preselection, identified by "P1" declares the three AdaptationSets (with id equal to 10, 11 and 12) as preselection components. Each of these AdaptationSet contains two Representations for HEVC tracks at different resolutions. The first AdaptationSet in the example describes an HEVC tile base track, the two others described HEVC tile tracks. Since there are two subsets for reconstruction here: the concatenation of segments for Representations 101, 111 and 121 on the one hand and for Representations 102, 112 and 122 on the other hand, the "singleInit"=true indicates that not all combinations inside the Preselection are allowed. Only the Representation sharing the same initialization segment can be combined for joint rendering, even if the "selectionType" attribute indicates the value "any". The "singleInit" is a warning to player that combinations of Representations inside the Preselection have to be carefully chosen to guarantee smooth display and seamless switching. Furthermore, the author of the MPD may indicate, for example with the bitstreamSwitching attribute at AdaptationSet level, that switching may not always be seamless across Representations, i.e. switching may require decoder reinitialization.

TABLE 1b

```
<MPD ....>
    <Period...>
        <AdaptationSet id="10" ...>
            <Representation id="100" codecs='hvc2..." width="1920" height="1080" ...
>...</Representation>
        </AdaptationSet >
        <AdaptationSet id="20" ...>
            <Representation id="200" codecs='hvc2..." width="960" height="540" ...
>...</Representation>
        </AdaptationSet >
        <AdaptationSet id="11" ...>
            <Representation id="110" dependencyId="100" codecs='hvt1..."
    width="1920" height="1080" ... >...</Representation>
        </AdaptationSet>
        <AdaptationSet id="21" ...>
            <Representation id="210" dependencyId="200" codecs='hvt1..."
width="960" height="540" ... >...</Representation>
        </AdaptationSet >
        <AdaptationSet id="12" ...>
            <Representation id="120" dependencyId="100" codecs='hvt1..."
    width="1920" height="1080" ... >...</Representation>
        </AdaptationSet >
        <AdaptationSet id="22" ...>
            <Representation id="220" dependencyId="200" codecs='hvt1..."
width="960" height="540" ... >...</Representation>
        </AdaptationSet >
        <Preselection id="P1" preselectionComponents="10 11 12" singleInit="false" />
        <Preselection id="P2" preselectionComponents="20 21 22" />
    </Period>
</MPD>
```

The MPD example of Table 1b provides an alternative for the description of 2 HEVC tile tracks at different resolution levels. In this example, each resolution level is available to streaming client as a Preselection. Preselection "P1" provides a preselection for HD resolution while Preselection "P2" provides a preselection at SD resolution. Since the author guarantees seamless switching among Representations in each Adaptation Sets 10, 11, 12 and 20, 21, 22, the "singleInit" value for the Preselection element can be set to value "false". This allows any combination of Representations inside the Preselection. The Preselection "P2" does not declare any value for singleInit assuming the default value that is equal to "false". As a summary, the parameter "singleInit", when set to the value "true", indicates that only Representations sharing the same initialization segment may be combined, whatever the use case: several resolutions in video streams or different qualities but not seamlessly switchable.

The Table 2a provides an example of HEVC tile tracks described in a DASH MPD. More precisely, it provides an example of tile tracks with quality equivalence descriptor exposed in a Preselection descriptor.

TABLE 2a

```
<MPD ....>
    <Period...>
        <AdaptationSet id="1" ...>
            <Representation id ="1.1" codecs="hev2..." bandwidth="312" ...>
                // Segment URLs for the tile base track...
            </Representation>
        </AdaptationSet>
        <AdaptationSet id="2" ...>
            <Representation codecs="hvt1..." dependencyId="1.1"
    qualityRanking="1"...>
                ...
            </Representation>
            <Representation codecs="hvt1..." dependencyId="1.1"
    qualityRanking="2"...>
        </AdaptationSet>
        // other AdaptationSets for the 3 other tile tracks
        <AdaptationSet id="3" ...> ... </AdaptationSet >
        <AdaptationSet id="4" ...> ... </AdaptationSet >
        <AdaptationSet id="5" ...> ... </AdaptationSet>
        <SupplementalProperty schemeIdUri="urn:mpeg:dash:preselection:2016 "
    id="P1" value="1, 2, 3, 4, 5" singleInit="true"/>
        <SupplementalProperty schemeIdUri="urn:mpeg:dash:quality-equivalence"
    value="P:P1">
    </Period>
</MPD>
```

In this example, the manifest describes one AdaptationSet for the tile base track (with id="1" providing in its child Representation(s) one or more alternative encoded versions, each in a 'hev2' track). The manifest also describes one AdaptationSet per tile track (4 tiles), 'hvt1' tracks. In the example above (Table 2a), the Preselection description defines the Preselection identifier in the "id" attribute and the list of media components that compose the Preselection in the "value" attribute as a space-separated list of identifiers (list of AdaptationSet identifiers in the Table 2a example).

The main AdaptationSet is the one describing the tile base track (the one with @id="1"). The Partial AdaptationSets (id 2 to 5 in the example) correspond to the AdaptationSets for each tile track 'hvt1'. It is to be noted that each Representation for a tile track 'hct1' contains a "dependencyId" attribute to the Representation corresponding to its tile base track. Moreover, each Representation of each tile track has a "qualityRanking" attribute. This lets two options for the description of hvt1 tile tracks. In a first option, the tile base track (not the one in Table 2a) is not declared in the list of preselection's components. The Preselection then only declares the (hvt1) tile tracks. The tile base track is automatically selected for download and display due to the dependencies from each tile track (each tile track has a 'tbas' track reference to the tile base track). The value for the "selectionType" attribute of the Preselection is then "any". A second option (the one on table 2a) is to include the tile base track in the list of preselection's components. The AdaptationSet corresponding to the tile base track is then listed first in the list of preselection's components. Each Representation corresponding to a tile track still declares a dependency to the corresponding Representation for the tile base track (due to 'tbas' track reference type). The value for the "selectionType" attribute of the Preselection is then set to "main".

In the example of Table 2a, optionally the Preselection descriptor also contains the "singleInit" attribute, here set to true, to indicate that a DASH player should only combine Representations of content components (one, many or all, depending on the value of the "selectionType" parameter) sharing the same initialization segment, the one for the tile base track. It is to be noted that the DASH dependency mechanism, based on Representation's "dependencyId" attribute allows to identify and to concatenate the initialization segment and the media segment to obtain a segment or sub-segment sequence conforming to the media format as specified in the @mimeType of the selected Representations. A quality equivalence is also present in the MPD, here referring to the Preselection with the "P1" identifier. Note that any attribute ("tag" . . . ) or value (the first parameter in "value" attribute for example) allowing Preselection identification could be used to refer to the Preselection. The quality equivalence indicates that a quality equivalence between the Representations of the media components listed in the Preselection applies. For example, from one AdaptationSet to another, equivalent Representations in terms of quality can be identified. The quality equivalence here does not provide a recommendation on the maximum quality difference among these Representations. As shown in the above examples, the quality equivalence can apply to a Preselection element. As such, it can be defined as a child of a Preselection element, then the parameter for content component selection is no more needed. As such, it is considered optional parameter in the quality equivalence descriptor. The examples above use AdaptationSets describing tile base tracks and tile tracks but similarly apply to any media tracks (audio or video for example).

For Example:

TABLE 2b

```
<Preselection id="P1" preselectionComponents="(list of media components) .... >
    <SupplementalProperty schemeIdUri="urn:mpeg:dash:quality-equivalence" >
    </Preselection>
```

In the example Table 2b, the simple presence of the descriptor indicates that for all components of the Preselection (the parent element of the quality equivalence descriptor), a quality equivalence applies. In this particular case with default values for all the quality equivalence parameters, it implicitly means that all content components of the parent Preselection element have qualityRanking that can be compared across AdaptationSets. Moreover, the recommended quality difference is 0, which corresponds to the default value.

TABLE 2c

```
<Preselection id="P1" preselectionComponents="(list of media components) .... >
    <SupplementalProperty schemeIdUri="urn:mpeg:dash:quality-equivalence" value="2">
</Preselection>
```

In the example Table 2c, the presence of the quality equivalence descriptor indicates that for all components of the parent Preselection element, a quality equivalence applies with a maximum quality difference equal to 2. The list of concerned components is implicit since the descriptor is declared as a child of the Preselection element: it then applies to all content components of the Preselection.

TABLE 2d

```
<Preselection id="P1" preselectionComponents="11, 12, 13, 14" ... >
    <SupplementalProperty         schemeIdUri="urn:mpeg:dash:quality-equivalence" value="AS:13,14 2">
</Preselection>
```

In the above example (Table 2d), the presence of the quality equivalence descriptor indicates that for a subset of components (the AdaptationSets with "id" equal to 13 and to 14) of the Preselection, a quality equivalence applies with a maximum quality difference equal to 2.

TABLE 2e

```
<Preselection id="P1" preselectionComponents="11, 12, 13, 14" ... >
    <SupplementalProperty         schemeIdUri="urn:mpeg:dash:quality-equivalence" value="AS:13,14">
</Preselection>
```

In the above example, (Table 2e) the presence of the quality equivalence descriptor indicates that for a subset of components (the AdaptationSets with "id" equal to 13 and to 14) of the Preselection, a quality equivalence applies, with a maximum quality difference equal to 0 (which is the default value).

TABLE 2f

```
<Preselection id="P1" preselectionComponents="11, 12, 13, 14" ... >
    <SupplementalProperty schemeIdUri="urn:mpeg:dash:quality-equivalence" value="*">
</Preselection>
```

In the above example (Table 2f), the presence of the quality equivalence descriptor indicates that for all the components of the Preselection, a quality equivalence applies with a default maximum quality difference equal to 0 (which is the default value).

TABLE 2g

```
<Preselection id="P1" preselectionComponents="11, 12, 13, 14" ... >
    <SupplementalProperty schemeIdUri="urn:mpeg:dash:quality-equivalence" value="* 1">
</Preselection>
```

In the above example (Table 2g), the presence of the quality equivalence descriptor indicates that for all the components of the Preselection, a quality equivalence applies with a default maximum quality difference equal to 1. Note the above declaration for the quality equivalence descriptor is equivalent to the following one:

<SupplementalProperty schemeldUri="urn:mpeg:dash:quality-equivalence" value="1">

As the Preselection element and descriptor are extensible from schema point of view, the same use of the quality equivalence applies to Preselection element or descriptor extended with new elements or attributes.

The quality equivalence descriptor similarly applies to the Preselection descriptor.

TABLE 3a

```
<MPD...> ...
<Period ...>
    <SupplementalProperty schemeIdUri="urn:mpeg:dash:preselection:2016" value="P1 1 2 3">
    <SupplementalProperty schemeIdUri="urn:mpeg:dash:quality-equivalence" value="P:P1">
        <AdaptationSet id="1"... > ... </AdaptationSet>
        <AdaptationSet id="2"... > ... </AdaptationSet>
        <AdaptationSet id="3"... > ... </AdaptationSet>
        ...
</Period> ...
</MPD>
```

The example on table 3a indicates that the quality equivalence descriptor applies to all the content components declared in the Preselection descriptor identified by "P1" with a maximum quality difference equal to 0 (default value).

TABLE 3b

```
<MPD...> ...
<Period ...>
    <SupplementalProperty schemeIdUri="urn:mpeg:dash:preselection:2016" value="P1 1 2 3">
    <SupplementalProperty schemeIdUri="urn:mpeg:dash:quality-equivalence" value="AS:1 2">
        <AdaptationSet id="1"... > ... </AdaptationSet>
        <AdaptationSet id="2"... > ... </AdaptationSet>
        <AdaptationSet id="3"... > ... </AdaptationSet>
        ...
</Period> ...
</MPD>
```

The example in table 3b indicates that the quality equivalence descriptor applies to a subset of the content components declared in the Preselection descriptor identified by "P1" with a maximum quality difference equal to 0 (default value).

TABLE 3c

```
<MPD...> ...
<Period ...>
    <SupplementalProperty schemeIdUri="urn:mpeg:dash:preselection:2016" value="P1 1 2 3">
    <SupplementalProperty schemeIdUri="urn:mpeg:dash:quality-equivalence" value="P:P1 2">
    <AdaptationSet id="1"... > ... </AdaptationSet>
    <AdaptationSet id="2"... > ... </AdaptationSet>
    <AdaptationSet id="3"... > ... </AdaptationSet>
    ...
</Period> ...
</MPD>
```

The example on table 3c indicates that the quality equivalence descriptor applies to all the content components declared in the Preselection descriptor identified by "P1" with a maximum quality difference equal to 2.

TABLE 3d

```
<MPD...> ...
<Period ...>
    <SupplementalProperty schemeIdUri="urn:mpeg:dash:preselection:2016" value="P1 1 2 3">
    <SupplementalProperty schemeIdUri="urn:mpeg:dash:quality-equivalence" value="AS:1,2 1 ">
    <AdaptationSet id="1"... > ... </AdaptationSet>
    <AdaptationSet id="2"... > ... </AdaptationSet>
    <AdaptationSet id="3"... > ... </AdaptationSet>
    ...
</Period> ...
</MPD>
```

The example on table 3d indicates that the quality equivalence descriptor applies to a subset of the content components declared in the Preselection descriptor identified by "P1" (here, the AdaptationSets with id equal 1 and 2) with a maximum quality difference equal to 1.

TABLE 3e

```
<MPD...> ...
<Period ...>
    <SupplementalProperty schemeIdUri="urn:mpeg:dash:preselection:2016" value="P1 1 2">
    <SupplementalProperty schemeIdUri="urn:mpeg:dash:preselection:2016" value="P2 1 3">
    <SupplementalProperty schemeIdUri="urn:mpeg:dash:quality-equivalence" value="P: P1,P2">
    <AdaptationSet id="1"... > ... </AdaptationSet>
    <AdaptationSet id="2"... > ... </AdaptationSet>
    <AdaptationSet id="3"... > ... </AdaptationSet>
    ...
</Period> ...
</MPD>
```

The example on table 3e indicates that the quality equivalence descriptor applies to all content components of both Preselection descriptors identified by "P1" and "P2". The maximum quality difference is 0 (default value).

TABLE 3f

```
<MPD...> ...
<Period ...>
    <SupplementalProperty schemeIdUri="urn:mpeg:dash:preselection:2016" value="P1 1 3">
    <SupplementalProperty schemeIdUri="urn:mpeg:dash:preselection:2016" value="P2 2 4">
    <SupplementalProperty schemeIdUri="urn:mpeg:dash:quality-equivalence" value="P: P1">
    <SupplementalProperty schemeIdUri="urn:mpeg:dash:quality-equivalence" value="P: P2 1">
    <AdaptationSet id="1"... > ... </AdaptationSet>
    <AdaptationSet id="2"... > ... </AdaptationSet>
    <AdaptationSet id="3"... > ... </AdaptationSet>
    <AdaptationSet id="4"... > ... </AdaptationSet>
    ...
</Period> ...
</MPD>
```

The example of Table 3f indicates that a first quality equivalence descriptor applies to the Preselection descriptor identified by "P1", with a maximum quality difference equal to 0.

A second quality equivalence descriptor applies to the Preselection descriptor identified by "P2", with a maximum quality difference equal to 1.

When no Preselection element is declared in the MPD, the quality equivalence descriptor when present can directly reference soma AdaptationSets through its first parameter. The second parameter can indicate a maximum quality difference or by default indicate a maximum quality difference value equal to 0. The tables below provide some example of use.

TABLE 4a

```
<MPD...> ...
<Period ...>
    <SupplementalProperty schemeIdUri="urn:mpeg:dash:quality-equivalence" >
    <AdaptationSet id="1"... > ... </AdaptationSet>
    <AdaptationSet id="2"... > ... </AdaptationSet>
    <AdaptationSet id="3"... > ... </AdaptationSet>
    <AdaptationSet id="4"... > ... </AdaptationSet>
</Period> ...
</MPD>
```

The example on Table 4a indicates that the quality equivalence descriptor applies to all content components (here AdaptationSets with id 1 to 4) defined for the given Period with a maximum quality difference value equal to 0.

TABLE 4b

```
<MPD...> ...
<Period ...>
    <SupplementalProperty schemeIdUri="urn:mpeg:dash:quality-equivalence" value="3">
    <AdaptationSet id="1"... > ... </AdaptationSet>
    <AdaptationSet id="2"... > ... </AdaptationSet>
    <AdaptationSet id="3"... > ... </AdaptationSet>
    <AdaptationSet id="4"... > ... </AdaptationSet>
</Period> ...
</MPD>
```

The example on Table 4b indicates that the quality equivalence descriptor applies to all content components (here AdaptationSets with id 1 to 4) defined for the given Period with a maximum quality difference value equal to 3. While the maximum quality difference is explicit, the list of content components concerned by quality equivalence is implicit. The notation above is equivalent to the following one:

<SupplementalProperty schemeIdUri="urn:mpeg:dash:quality-equivalence" value="*3">

TABLE 4c

```
<MPD...> ...
<Period ...>
    <SupplementalProperty schemeIdUri="urn:mpeg:dash:quality-equivalence" value="AS: 1,2">
    <AdaptationSet id="1"... > ... </AdaptationSet>
    <AdaptationSet id="2"... > ... </AdaptationSet>
    <AdaptationSet id="3"... > ... </AdaptationSet>
    <AdaptationSet id="4"... > ... </AdaptationSet>
</Period> ...
</MPD>
```

The example on Table 4c indicates that the quality equivalence descriptor applies to a subset of content components (here AdaptationSets with id 1 and 2) defined for the given Period with a maximum quality difference value equal to 0 (default value). While the maximum quality difference is implicit, the list of content components concerned by quality equivalence is explicit.

TABLE 4d

```
<MPD...> ...
<Period ...>
    <SupplementalProperty schemeIdUri="urn:mpeg:dash:quality-equivalence" value="AS: 1,2 1">
    <AdaptationSet id="1"... > ... </AdaptationSet>
    <AdaptationSet id="2"... > ... </AdaptationSet>
    <AdaptationSet id="3"... > ... </AdaptationSet>
    <AdaptationSet id="4"... > ... </AdaptationSet>
</Period> ...
</MPD>
```

The example on Table 4d indicates that the quality equivalence descriptor applies to a subset of content components (here AdaptationSets with id 1 and 2) defined for the given Period with a maximum quality difference value equal to 1 (explicit value).

TABLE 4e

```
<MPD...> ...

<Period ...>

<SupplementalProperty schemeIdUri="urn:mpeg:dash:quality-equivalence" value="AS: 1,2 1">

SupplementalProperty schemeIdUri="urn:mpeg:dash:quality-equivalence" value="AS: 3,4 2">

<AdaptationSet id="1"... > ... </AdaptationSet>

<AdaptationSet id="2"... > ... </AdaptationSet>

<AdaptationSet id="3"... > ... </AdaptationSet>

<AdaptationSet id="4"... > ... </AdaptationSet>

</Period> ...

</MPD>
```

The example on Table 4e indicates that two quality equivalence descriptor apply each to a subset of Adaptation-Sets defined in the Period element. The first one recommends a maximum quality difference value equal to 1 while the second recommends a maximum quality difference value equal to 2.

When defined above the Period element, the quality equivalence descriptor similarly applies to the content components (Preselection element or Preselection descriptor or AdaptationSet element or ContentComponent element) defined in each Period of the MPD.

It is to be noted that when the quality equivalence descriptor refers to a Preselection element or descriptor that declares a "singleInit" parameter equal to "true", the possible combination of Representations are constrained by the constraints on initialization segment first, then on qualityRanking.

When the quality equivalence is declared at Period level and when this quality equivalence descriptor does not indicate any content components, then the quality equivalence applies to all media components declared inside the parent element of the quality equivalence descriptor. This means that when multiple content component selection elements, for example Preselection element or descriptor, are present inside this parent element, the quality equivalence applies to all the media components of all the Preselections. This does not mean that any combinations are allowed, this is rather indicated by the components of each Preselection and eventually with the "singleInit" parameter. In case the quality equivalence applies to only one Preselection in a list of Preselections declared at a given level in the streaming manifest, the quality equivalence descriptor should indicate in a content component selection parameter the list of media component impacted by the quality equivalence.

FIG. 6, comprising FIGS. 6a to 6d, illustrates examples of manifests according to the "content creator" embodiments, when using a quality rule descriptor, and when using a quality equivalence descriptor.

FIG. 6a is directed to the tile-based streaming. Considering as input the video configuration illustrated in FIG. 1, FIG. 6a provides an example of one streaming manifest 600 with one tile description, denoted 601, (among the nine tiles, for the sake of brevity and clarity, the other 8 tiles would be described in a similar way). This streaming manifest declares a content component selection element 602 based on the use of a specific AdaptationSet element (the "virtual" attribute and the "purpose" attribute). The SRD descriptor 603 indicates that this virtual AdaptationSet 602 consists in the assembling of the 9 tiles in a resulting video of 3×3 tiles.

The second descriptor 604 is the "decoder requirement" descriptor indicating here that the composition will require multiple decoders, probably one per tile. In an alternative embodiment, the "multiple" value expects a "number" value that indicates the number of required simultaneous decoder instances, for example value="multiple=9".

A first Representation 605 is declared in the manifest to describe explicitly the quality equivalence for all the Representations involved in the composition described in 602. This quality equivalence is given here for example in the associationId attribute as the list of all Representations in concerned AdaptationSets by the composition 602. This list contains all the Representations with the same quality level (here corresponding to "HQ" highest quality level of FIG. 1). The tile Representation mentioned in the dependencyId attribute (5.1 in the example) is the tile that the content creator describes as the main component of the combination 602. This is the one that would be played by a client apparatus not supporting the preselection or combination description or not able to decode nine tiles at a time.

The following Representation describes alternatives for the preselection, combination or composition 602, in case the client apparatus needs to dynamically adapt the streaming. By default, it is assumed that the order of declaration of the Representations inside a content component selection element go from highest quality to lowest quality. This can be explicit by using the qualityRanking attribute in these Representations (with its original semantics, not overloaded by a quality equivalence descriptor as in previous embodiments).

For example, Representation 606 (with id="C.2") indicates an alternative version of the composition to the client apparatus, at a lower overall quality for the resulting composed video. This alternative still considers the central tile in highest quality (Representation "5.1" in the dependencyId attribute) but degrades the quality for the surrounding tiles: all are selected from the "MQ" Representation in 606.

The last Representation 607 describes another alternative if bandwidth does not enable to use one of the previous Representation: this one degrades the quality for the central tile from "HQ" to "MQ" (Representation "5.2" in the dependencyId attribute) and also for the surrounding tiles with a particular pattern: tiles on the same row are preserved in mid quality (Representations 4.2 and 6.2 in the associationId attribute) while the remaining tiles (above and below rows) are degraded to the lowest quality. This explicitly indicates the quality rule chosen by the content creator and is an alternative to a quality degradation pattern expressed in a quality rule descriptor as explained in a previous embodiment.

FIG. 6b is an alternative embodiment where the content component selection element uses an extension of the Preselection element. It declares in a required, for example in a required attribute "preselectionComponents", the list of content component or AdaptationSets involved in the combination or preselection. In this example this mainly consists in declaring a tile from FIG. 1 in each AdaptationSet. This can be done by using a unique identifier of the content component or AdaptationSet like the "id" attribute or a "tag" attribute or any syntax other element reserved for identification purpose.

This preselection element contains an SRD descriptor 623 to indicate that the Preselection results in a picture assembling the 9 tiles into one big video. The second descriptor, decoder requirements descriptor 624, indicates that the composed video resulting from the Preselection can be decoded and displayed with a single decoder, but requires first a bit-stream reconstruction (object of the second parameter in the value attribute of the decoder requirements descriptor). This bit-stream reconstruction means the concatenated bit-streams of each video content component involved in the preselection (i.e. for each tile), have to be transcoded into a single bit-stream, here having 9 tiles. Another descriptor 625 indicates that the purpose of the preselection is "tile composition". This is a useful indication for the bit-stream reconstruction process: the client can interpret it has to reconstruct a bit-stream of type indicated by the value of the codec attribute declared in the content component selection element (here the Preselection element) and 'hvc2 . . . ' followed by profile, tier, level information, in the given example meaning it should actually be an HEVC bit-stream.

Then follow, as in the example of FIG. 6a, the list of alternative Representations with an explicit qualityRanking attribute here, to make sure that client understands the ordering of these alternatives (It is to be noted that the selectionPriority attribute can also be used). The bandwidth attribute that indicates the aggregated bandwidth for the composed video for each Representation of the preselection or combination can also be used by the client for its dynamic adaptation.

In alternative embodiments the purpose descriptor 625 can be implemented as a new attribute or element of the Preselection element. Similarly, the decoder requirements descriptor can be implemented as a new attribute or element of the Preselection element. In both cases, FIGS. 6a and 6b, the "composition purpose" descriptor can alternatively be declared as a Label element in the content component selection element.

FIG. 6c illustrates the same media presentation (i.e. the 9 tiles of FIG. 1 and their combination with a focus on the central one) when using a quality rule descriptor 640 and a quality equivalence descriptor 641 expressed at the beginning of the Period. The AdaptationSet 642 is the description of tile 1. The MPD would contain one such AdaptationSet per tile (not represented for the sake of brevity and clarity). In this example, the content component selection descriptor, here the Preselection element 643, does not contain any Representation for dynamic adaptation. Instead, a client apparatus relies on the set of Representation across the AdaptationSets listed in the preselectionComponents attribute that have an equivalent quality level. Then, following the quality rule descriptor 640, the client apparatus computes a authorized quality degradation when needed. In this example, the quality rule descriptor 640 indicates that no Representations assembled in the preselection should have a greater quality ranking difference than 2, thus reducing the number of possible combinations for client selection. It is to be noted that the quality equivalence in the example illustrated in FIG. 6c provides in its value attribute the list of AdaptationSets involved in the preselection. Here it is based on the value of their "id" attribute. In order to disambiguate which parameter of a media content component is used to indicate the quality equivalence, the value put in the schemeIdUri attribute can be defined so as to be really explicit, for example: "urn:mpeg:dash:quality-equivalence-id" to indicate that an attribute "id" is in use, or "urn:mpeg:dash:quality-equivalence-tag" to indicate that an attribute "tag" is in use to list the media content component involved in the preselection of combination. More generally, "urn:mpeg:dash:quality-equivalence-xxx" to indicate that the "xxx" syntax element is used to identify media content components that are parts of the preselection or combination.

An alternative embodiment to make the reference explicit is to keep a generic value in the schemeIdUri attribute and to start with a first parameter in the value attribute that provides the syntax element used to list the concerned media content components.
For Example:
schemeIdUri="urn:mpeg:dash:quality-equivalence" and value="id, 1, 2" or
schemeIdUri="urn:mpeg:dash:quality-equivalence" and value="tag, AS1, AS2" will respectively indicate that AdaptationSets with id="1" and id="2" are involved in the preselection or combination and AdaptationSets with tag="AS1" and tag="AS2" are involved in the preselection or combination. More generally:
schemeIdUri="urn:mpeg:dash:quality-equivalence" and value="foo, foo1, foo2" will indicate that media content components with a "foo" element or attribute having a value foo1 and foo2 are part of a preselection or combination.

FIG. 6d illustrates an example according to which the quality equivalence descriptor is placed as a new attribute of the Representation element of each AdaptationSet (reference 661). Optionally, the content component selection element 663 can contain a syntax element listing some pre-defined quality levels for the preselection or combination.

According to the example illustrated in FIG. 6d, the Preselection element 663 contains a new "levels" attribute (name here is just for example) that is reserved for the description of the list of possible quality levels. This information can be placed as a child of the content component selection element, for example as a DASH descriptorType element, typically a Supplementa/Property element with its own schemeIdUri specific value. This is useful for the client to know that some adaptation is possible before selecting a composition or combination or preselection of media content components. Because if no dynamic adaptation is possible, this may result in poor quality of experience for the user and the streaming client may use this information to warn the client.

An alternative embodiment to associate the levels of quality with the content component selection element can be to define as first value of the preselect attribute of Representations 661 the value of the concerned combination or preselection, for example "P1" in the example of FIG. 6d. Preselect attribute would write: preselect="P1, HQ" or preselect="P1, MQ", etc. In case the content component selection element is an AdaptationSet or an extended AdaptationSet as described in a previous embodiment, the value of the "id" attribute can be used as well.

In the case of tile-based streaming where the input video is one tiled video HEVC bit-stream encapsulated (e.g. during encapsulation step 509 in FIG. 5) into tile base track plus 9 tile tracks (for each quality level). Then, some proposals made in MPEG DASH for the tile base track description in DASH can be reused.

In the specific case of tiles and video streams, one or more AdaptationSets corresponding to the description of a tile base track as defined in ISO/IEC 14496-15 4th edition can be used. This also requires some indication of quality equivalence between the Representations that depends on this AdaptationSet tile base track as the content component descriptor since it allows the reconstruction of all, one or a set of tiles. The particular part of the AdaptationSet here is the fact that it shares among all the tile tracks involved in the preselection or combination a tile base track containing the decoder setup information. The purpose descriptor indicates HEVC tiling and the decoder requirement descriptor indicates that only a single instance of video decoder can handle the resulting composed video.

When tiles are used for VR or 360° video, to contain data for a given region, for example a part of a spherical scene projected onto the faces of a cube, the invention also applies to handle the quality between for example the front view and the other views. More generally, it applies to VR content when projected parts of the recorded 3D scene is projected onto a 2D surface contained in one or more tiles. With the above embodiments, the streaming client knows that there is a degradation quality pattern indicated by the content creator. It takes it into consideration when requesting the media. This should be helpful for a consistent experience across streaming clients. Another embodiment can consist in letting clients implement their own proprietary solutions for the quality adaptation as explained in the following.

Client Adaptation Logic

According to particular embodiments, a graphical user interface of a client apparatus can be used to pick several video streams in a media presentation to compose and render them in the same display window. This can be done for example by selecting a set of tiles by drawing a rectangle onto the video being played, or statically by defining some settings for automatic ROI display, or any other selection means.

Alternatively, a user/client apparatus may not select a specific set of tiles as being an ROI, but selects all the tiles. In such cases, the whole set of tiles can be considered as the ROI and the quality adaptation has to be performed to make sure that there will not be too much difference in terms of quality between these tiles. To that end, each video stream is described in terms of quality, bitrate, resolution, etc., and corresponding URL to download the corresponding data is also provided.

According to these embodiments, client apparatuses implement different adaptation algorithms to optimize the global visual quality of the rendered video composition, while favoring the quality of the set of tiles of the ROI. For example, in one embodiment, a client apparatus runs a classical optimization algorithm that is applied to solve a rate allocation problem. The optimization is run in order to select a good representation for each tile, under the constraint of the maximum available bandwidth. The objective function to maximize thus represents the overall rendering quality, giving more priority to ROI tiles and penalizing the difference of quality between neighboring tiles so as to control the quality disparity or quality difference between different areas of the video. For instance, the objective function to maximize could be:

$$\alpha \Sigma_{t \in ROI} q(t) + \beta \Sigma_{t \in \overline{ROI}} q(t) - \gamma \Sigma_{(t_1, t_2) \in NBT} |q(t_1) - q(t_2)|^2,$$

where

ROI is the set of tiles belonging to the ROI;

$\overline{ROI}$ is the set of tiles not belonging to the ROI;

NBT is a set of tile neighborhoods: it contains a set of pairs of tiles, each pair containing two neighbor tiles;

q(t) provides a quality value for a given tile t, this quality being dependent on the selected representation for that tile; and $\alpha$, $\beta$ and $\gamma$ are parameters determined offline for obtaining a good tradeoff between the perceived overall quality, and the ROI quality. For instance, $\alpha=2$, $\beta=1$, $\gamma=0.5$ could be used.

The inputs of this optimization algorithm would thus be:
the maximum available bandwidth,
the possible bandwidth/available bitrates of each possible Representation of each selected tile and associated qualities, and
the tiles covering the ROI for which the user would like to have a better quality,
and the tile geometry to preserve closer tiles.

The qualities for a given tile are estimated for instance by ordering the bitrates of the representations (or using qualityRanking attribute if present) of this tile, from the highest bitrate to the lowest bitrate, and fitting them to a Rate/Distorsion curve.

For simplicity, the quality can be set to 1/n for the n-th bitrate: the highest bitrate would then have a quality equal to 1. Alternatively, the quality of the n-th bitrate could be set to $r_n/r_1$, where $r_n$ is the n-th bitrate and $r_1$ is the highest bitrate for a representation of that tile.

This kind of problem can be seen as a combinatorial optimization problem.

It can be solved, or a sub-optimal solution may be found using classical optimization algorithms. For instance, dynamic programming, or expert system technics may be used. Heuristics can also be used to simplify the optimization process. As an example of such a possible optimization algorithm, a zero weight is given to each ROI tile and a weight is given to each other tile being its minimum Manhattan distance to an ROI tile. The optimization starts by associating no quality with all the tiles (i.e. the tiles will not be transmitted). Next, while the maximum bandwidth is not exceeded, the lowest quality for the tiles with a zero weight, then with 1 weight, up to the highest weight, are iteratively considered. Next, while the maximum bandwidth is not exceeded, starting with 'max_d=0', the quality (if a better quality is available) of the tiles with a zero weight, up to the tiles with a 'max_d' weight is iteratively increased. Then 'max_d' is increased. If not all the tiles have the best quality, the algorithm continues. These values are used to first drop quality of the farthest tiles, then to the farthest and 'farthest-1' tiles. This optimization algorithm makes it possible to obtain a maximum quality difference of '1' between neighboring tiles. It could be easily extended to support other maximum quality difference, or other patterns of quality variations.

This kind of optimization algorithm can be embedded in a client apparatus as a pre-defined adaptation logic algorithm. Other adaptation logic algorithms may also be embedded in the client apparatus (e.g. module 309 in FIG. 3), each following a different pre-determined quality adaptation rule. Then, depending on a user choice for usage of the content, the client apparatus can activate the most relevant adaptation algorithm.

The selection of the most relevant algorithm can be let to the client, so that no additional signaling is required in the streaming manifest. This simplifies the task of the content creator.

Another alternative is directed to an extension of the classical adaptation logic (e.g. adaptation logic 308 in FIG. 3) running for one AdaptationSet at a time: the client computes possible combination using information from the manifest: for example SRD descriptors, Preselection elements, etc. Then, it builds an in-memory ordered list of possible combinations with associated required bandwidth (as the sum of @bandwidth of each Representation involved in the combination).

Next, to avoid spending too much time in switching, the set of possible combinations can be reduced to a subset of pre-determined combinations, for example to 5 alternatives. This can be done by keeping combinations with a significant difference in terms of required bandwidth. By doing so, the client can keep on using adaptation logic as for one Adaptation Set by switching to next set of Representations when more bandwidth is available (or buffer is filling rapidly) or at the reverse switch back to a lower set of Representations when available bandwidth is decreasing (or buffer risks starvation). The main difference is that, in this case, the switch results in multiple requests (one per Representation in the set of Representations with same media type that form the combination) whereas in classical use case, the switch results in one request for the segment of one Representation of a given media type. These adaptation logics could be run directly without any requiring the "quality rule" descriptor. In which case all the choices are let to the client. Alternatively, the client can take benefits of the "quality rules" and/or of the "quality equivalence" descriptors in order to select the best one of its adaptation logic in order to improve the rendering to the user.

Server Apparatus Control: Push and Redirection

According to particular embodiments, the client apparatus requests the media segments without information on the quality adaptation rule. In this embodiment, the quality adaptation rules are kept at server side and the streaming manifest does not contain the quality adaptation rule descriptor introduced in the previous embodiments.

The manifest can contain the description of combinations or preselection. In this embodiment, the user through a graphical user interface can select a viewing mode like, for example emphasis on a ROI and lower versions of surrounding tiles. If the server and the client both support HTTP/2, the client can indicate to the server, while requesting the main component of the combination or preselection that it is also interested in the other components.

This can be done by introducing a new push directive, for example with push type name set to "urn:mpeg:dash:fdh:push-bundle". This requires the server to also support push directives and to be aware of the possible combination or preselections. The quality rule is also known by the server, for example a maximum difference in quality level between the main resource and the other components of a preselection. This can be done with a DASH aware server capable of analyzing the streaming manifest or by a server configured so that it knows which resources are related to the main resource of a preselection. In response to the GET request on the main resource of the preselection, the server can promise to push the related resource in the preselection. From the requested resource, when knowing the MPD, the server can determine the level of quality requested by the client. Alternatively, the push directive can indicate as a parameter of the push-bundle directive the level of quality requested for the main resource. For example, it can be given as the bandwidth information:

Accept-Push-Policy="urn:mpeg:fdh:push-bundle"; "bw:1000000" meaning the main resource is requested at 1 Mbit/sec. or as an indication of a quality level:

Accept-Push-Policy="urn:mpeg:fdh:push-bundle"; "qRank:HQ" in the case of the tiles of FIG. 1, or in case the preselect attribute is used for quality equivalence:

Accept-Push-Policy="urn:mpeg:fdh:push-bundle"; "preselect:HQ". In the ROI use case, this push-directive can simplify the requesting by the client: it issues a request for the video parts corresponding to the ROI while the server pushes the surrounding tiles. This push-directive based approach simplifies the client task: it only has to know that a preselection exists, to focus on requesting the main resource and to wait for the server to send additional components in a quality level homogeneous with the one selected for the main resource. When accepting and applying the push directive, the server replies with a push Ack:

Push-policy="urn:mpeg:fdh:push-bundle"; without any parameters to acknowledge the request and directive sent by the client. When the acknowledgment of the push-bundle contains a parameter, it is used by the client to identify a quality equivalence level in the preselection or combination of media content components. This can be a parameter like "preselect=HQ" or "qRank=MQ" depending on which quality equivalence descriptor is in use.

Figure 7:
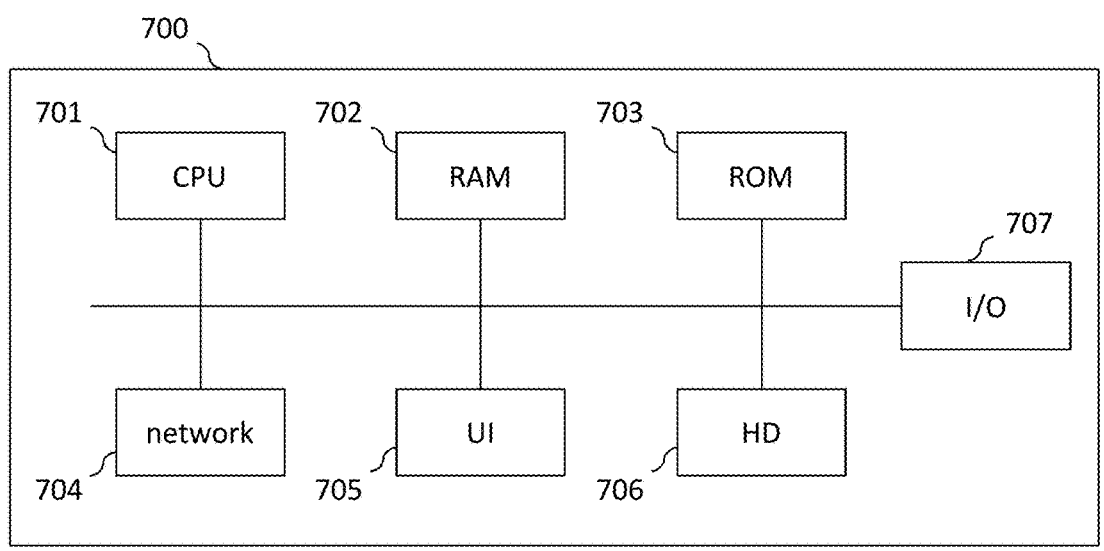
FIG. 7 is a schematic block diagram of a computing device for implementation of one or more embodiments of the invention.

FIG. 7 is a schematic block diagram of a computing device 700 for implementation of one or more embodiments of the invention. The computing device 700 may be a device such as a micro-computer, a workstation or a light portable device. The computing device 700 comprises a communication bus connected to:

- a central processing unit (CPU) 701, such as a microprocessor;
- a random access memory (RAM) 702 for storing the executable code of the method of embodiments of the invention as well as the registers adapted to record variables and parameters necessary for implementing the method for streaming data, the memory capacity thereof can be expanded by an optional RAM connected to an expansion port for example;
- a read only memory (ROM) 703 for storing computer programs for implementing embodiments of the invention;
- a network interface 704 that is, in turn, typically connected to a communication network over which digital data to be processed are transmitted or received. The network interface 704 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 701;
- a user interface (UI) 705 for receiving inputs from a user or to display information to a user;
- a hard disk (HD) 706;
- an I/O module 707 for receiving/sending data from/to external devices such as a video source or display.

The executable code may be stored either in read only memory 703, on the hard disk 706 or on a removable digital medium such as for example a disk. According to a variant, the executable code of the programs can be received by means of a communication network, via the network interface 704, in order to be stored in one of the storage means of the communication device 700, such as the hard disk 706, before being executed.

The central processing unit 701 is adapted to control and direct the execution of the instructions or portions of software code of the program or programs according to embodiments of the invention, which instructions are stored in one of the aforementioned storage means. After powering on, the CPU 701 is capable of executing instructions from main RAM memory 702 relating to a software application after those instructions have been loaded from the program ROM 703 or the hard-disc (HD) 706 for example. Such a software application, when executed by the CPU 701, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously

The invention claimed is:

1. A method of transmitting information for streaming media data comprising a base track and tile tracks, the method comprising, at a server device:
generating a media presentation description (MPD) for the media data comprising:
an Adaptation Set describing the base track;
for each of the tile tracks, an Adaptation Set describing the tile track;
a Preselection containing the Adaptation Set describing the base track and the Adaptation Sets describing the tile tracks, wherein a main Adaptation Set of the Preselection corresponds to the Adaptation Set describing the base track;
wherein the Adaptation Sets and the Preselection conform to Dynamic Adaptive Streaming over HTTP (DASH); and,
transmitting the MPD to a client device.

2. The method of claim 1, wherein the Adaptation Set describing the base track includes a Representation, and the Adaptation Sets describing the tile tracks include one or more Representations, and the Representations conform to DASH; wherein the Representations of the tile tracks and the Representation of the base track are associated with each other.

3. The method of claim 2, wherein each Representation describing the tile tracks comprises a dependencyId attribute having a value equal to an identifier of the Representation of the base track.

4. The method of claim 1, wherein the Adaptation Sets of the tile tracks and the Adaptation Set of the base track are associated with each other.

5. The method of claim 4, wherein the association of one Adaptation Set with another Adaptation Set is made using a quality equivalence descriptor.

6. The method of claim 1, wherein the MPD comprises data to indicate that the client device should only combine Representations sharing the initialization segment of the base track.

7. The method of claim 6, wherein the data to indicate comprise a preselection descriptor including an attribute.

8. A method of receiving information for streaming media data comprising a base track and tile tracks, the method comprising, at a client device:
receiving a media presentation description (MPD) for the media data comprising:
an Adaptation Set describing the base track;
for each of the tile tracks, an Adaptation Set describing the tile track;
a Preselection containing the Adaptation Set describing the base track and the Adaptation Sets describing the tile tracks, wherein a main Adaptation Set of the Preselection corresponds to the Adaptation Set describing the base track;
wherein the Adaptation Sets and the Preselection conform to Dynamic Adaptive Streaming over HTTP (DASH).

9. The method of claim 8, wherein the Adaptation Set describing the base track includes a Representation, and the Adaptation Sets describing the tile tracks include one or more Representations, and the Representations conform to DASH; wherein the Representations of the tile tracks and the Representation of the base track are associated with each other.

10. The method of claim 9, wherein each Representation describing the tile tracks comprises a dependencyId attribute having a value equal to an identifier of the Representation of the base track.

11. The method of claim 8, wherein the Adaptation Sets of the tile tracks and the Adaptation Set of the base track are associated with each other.

12. The method of claim 11, wherein the association of one Adaptation Set with another Adaptation Set is made using a quality equivalence descriptor.

13. The method of claim 8, wherein the MPD comprises data to indicate that the client device should only combine Representations sharing the initialization segment of the base track.

14. The method of claim 13, wherein the data to indicate comprise a preselection descriptor including an attribute.

15. A processing apparatus for transmitting information for streaming media data comprising a base track and tile tracks, the processing apparatus being configured to perform the steps of:
generating a media presentation description (MPD) for the media data comprising:
an Adaptation Set describing the base track;
for each of the tile tracks, an Adaptation Set describing the tile track;
a Preselection containing the Adaptation Set describing the base track and the Adaptation Sets describing the tile tracks, wherein a main Adaptation Set of the Preselection corresponds to the Adaptation Set describing the base track;
wherein the Adaptation Sets and the Preselection conform to Dynamic Adaptive Streaming over HTTP (DASH); and,
transmitting the MPD to a client device.

16. A processing apparatus for receiving information for streaming media data comprising a base track and tile tracks, the processing apparatus being configured to perform the steps of:
receiving a media presentation description (MPD) for the media data comprising:
an Adaptation Set describing the base track;
for each of the tile tracks, an Adaptation Set describing the tile track;
a Preselection containing the Adaptation Set describing the base track and the Adaptation Sets describing the tile tracks, wherein a main Adaptation Set of the Preselection corresponds to the Adaptation Set describing the base track;
wherein the Adaptation Sets and the Preselection conform to Dynamic Adaptive Streaming over HTTP (DASH).

* * * * *